US011145126B1

(12) United States Patent
Bramwell et al.

(10) Patent No.: US 11,145,126 B1
(45) Date of Patent: Oct. 12, 2021

(54) MOVEMENT INSTRUCTION USING A MIRROR IN AN ARTIFICIAL REALITY ENVIRONMENT

(71) Applicant: Facebook Technologies, LLC, Menlo Park, CA (US)

(72) Inventors: Chad Austin Bramwell, Sammamish, WA (US); Caryn Vainio, Hobart, WA (US); Charlene Mary Atlas, Redmond, WA (US); Mark Terrano, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/454,452

(22) Filed: Jun. 27, 2019

(51) Int. Cl.
*G06T 15/00* (2011.01)
*G06T 19/00* (2011.01)
*G06F 3/01* (2006.01)
*G06T 7/70* (2017.01)
*G06F 3/147* (2006.01)
*H04N 7/14* (2006.01)

(52) U.S. Cl.
CPC ............ *G06T 19/006* (2013.01); *G06F 3/011* (2013.01); *G06F 3/147* (2013.01); *G06T 7/70* (2017.01); *G06F 3/017* (2013.01); *G06T 2219/024* (2013.01); *H04N 7/147* (2013.01)

(58) Field of Classification Search
CPC ......... G06T 19/00; G06T 17/20; G06T 17/00; G06T 15/10; G06T 15/00
USPC ........................................................ 345/419
See application file for complete search history.

(56) References Cited

U.S. PATENT DOCUMENTS

| | | |
|---|---|---|
| 6,842,175 B1 | 1/2005 | Schmalstieg et al. |
| 8,970,692 B2 | 3/2015 | Tiao et al. |
| 9,183,676 B2 | 11/2015 | McCulloch et al. |
| 9,213,413 B2 | 12/2015 | Kauffmann et al. |
| 9,256,072 B2 | 2/2016 | Lyren |
| 9,269,157 B2 | 2/2016 | Saban et al. |
| 9,325,943 B2 | 4/2016 | Wilson et al. |
| 9,569,899 B2 | 2/2017 | Lyren |
| 9,615,081 B2 | 4/2017 | Torma |
| 9,641,805 B2 | 5/2017 | Wilson et al. |

(Continued)

OTHER PUBLICATIONS

U.S. Appl. No. 16/454,438, by Bramwell et al., filed Jun. 27, 2019.
(Continued)

*Primary Examiner* — Gordon G Liu
(74) *Attorney, Agent, or Firm* — Shumaker & Sieffert, P.A.

(57) ABSTRACT

This disclosure describes an artificial reality system that presents artificial reality content in the context of a physical environment that includes a mirror or other reflective surface. In one example, this disclosure describes a method that includes capturing capture data representative of a physical environment, wherein the physical environment includes a reflective surface and a plurality of objects, determining a pose of the HMD, determining a map of the physical environment, wherein the map includes position information about the reflective surface and position information about each of the plurality of physical objects in the physical environment, identifying a visible object from among the plurality of physical objects, and generating artificial reality content associated with the visible object.

17 Claims, 14 Drawing Sheets

(56) References Cited

U.S. PATENT DOCUMENTS

| | | |
|---|---|---|
| 9,933,855 B2 | 4/2018 | Ferens et al. |
| 10,021,149 B2 | 7/2018 | Miller |
| 10,044,982 B2 | 8/2018 | Wilson |
| 10,109,315 B2 | 10/2018 | Saban et al. |
| 10,204,452 B2 | 2/2019 | Kim et al. |
| 10,235,560 B2 | 3/2019 | Ohba et al. |
| 10,430,985 B2 | 10/2019 | Harrises |
| 10,478,723 B2 | 11/2019 | Scott et al. |
| 10,523,879 B2 | 12/2019 | Dye et al. |
| 10,540,812 B1 | 1/2020 | Yildiz et al. |
| 10,546,429 B2 | 1/2020 | Rhodes |
| RE47,925 E | 3/2020 | Torma |
| 10,636,222 B2 | 4/2020 | Clement et al. |
| 10,664,045 B2 | 5/2020 | Ross et al. |
| 10,692,290 B2 | 6/2020 | Estable |
| 10,706,117 B2 | 7/2020 | Cypher et al. |
| 10,762,709 B2 | 9/2020 | Jung et al. |
| 10,864,423 B2 | 12/2020 | Hung et al. |
| 2004/0135744 A1 | 7/2004 | Bimber et al. |
| 2009/0069096 A1* | 3/2009 | Nishimoto ............ A63F 13/814 463/43 |
| 2013/0057679 A1 | 3/2013 | Tiao et al. |
| 2013/0088490 A1 | 4/2013 | Rasmussen et al. |
| 2013/0286004 A1* | 10/2013 | McCulloch ........... G06T 19/006 345/419 |
| 2014/0226900 A1 | 8/2014 | Saban et al. |
| 2014/0232816 A1 | 8/2014 | Wilson et al. |
| 2015/0091780 A1 | 4/2015 | Lyren |
| 2015/0116463 A1 | 4/2015 | Torma |
| 2015/0185854 A1 | 7/2015 | Kauffmann et al. |
| 2015/0375114 A1 | 12/2015 | Scoff et al. |
| 2016/0100034 A1 | 4/2016 | Miller et al. |
| 2016/0127710 A1 | 5/2016 | Saban |
| 2016/0155273 A1 | 6/2016 | Lyren |
| 2016/0205353 A1 | 7/2016 | Wilson et al. |
| 2016/0284132 A1 | 9/2016 | Kim et al. |
| 2016/0359930 A1 | 12/2016 | Miller et al. |
| 2017/0052685 A1 | 2/2017 | Kovács et al. |
| 2017/0053456 A1 | 2/2017 | Cho et al. |
| 2017/0148221 A1 | 5/2017 | Lyren et al. |
| 2017/0199576 A1 | 7/2017 | Hanne et al. |
| 2017/0201722 A1 | 7/2017 | Wilson et al. |
| 2017/0206691 A1* | 7/2017 | Harrises ............ G02B 27/0172 |
| 2017/0285345 A1 | 10/2017 | Ferens et al. |
| 2017/0323489 A1 | 11/2017 | Clement |
| 2018/0011941 A1 | 1/2018 | Cypher et al. |
| 2018/0012064 A1 | 1/2018 | Ohba et al. |
| 2018/0059774 A1 | 3/2018 | Lee et al. |
| 2018/0095635 A1 | 4/2018 | Valdivia et al. |
| 2018/0121728 A1* | 5/2018 | Wells ................... G02B 27/017 |
| 2018/0126241 A1* | 5/2018 | Hung ................... A63B 69/004 |
| 2018/0239425 A1 | 8/2018 | Jang et al. |
| 2018/0330545 A1 | 11/2018 | Jung et al. |
| 2019/0050938 A1 | 2/2019 | Beraldo |
| 2019/0066381 A1 | 2/2019 | Estable |
| 2019/0204906 A1 | 7/2019 | Ross et al. |
| 2019/0251749 A1 | 8/2019 | Rhodes et al. |
| 2019/0342507 A1 | 11/2019 | Dye et al. |
| 2019/0347846 A1 | 11/2019 | Olson et al. |
| 2019/0371028 A1 | 12/2019 | Harrises |
| 2020/0013227 A1 | 1/2020 | Lyren |
| 2020/0066058 A1 | 2/2020 | Lyren |
| 2020/0074744 A1 | 3/2020 | Lyren |
| 2020/0074745 A1 | 3/2020 | Lyren |
| 2020/0074746 A1 | 3/2020 | Lyren |
| 2020/0143597 A1 | 5/2020 | Lyren |

OTHER PUBLICATIONS

U.S. Appl. No. 16/454,426, by Bramwell et al., filed Jun. 27, 2019.

* cited by examiner

MOVEMENT INSTRUCTION USING A MIRROR IN AN ARTIFICIAL REALITY ENVIRONMENT

TECHNICAL FIELD

This disclosure generally relates to artificial reality systems, such as virtual reality, mixed reality and/or augmented reality systems, and more particularly, to presentation of content and performing operations in artificial reality applications.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include a number of different types of artificial reality content, including see-through AR, overlay AR, completely-generated content, generated content combined with captured content (e.g., real-world video and/or images), or other types. During operation, the user typically interacts with the artificial reality system to select content, launch applications or otherwise configure the system.

SUMMARY

This disclosure describes an artificial reality system that presents artificial reality content in the context of a physical environment that includes a mirror or other reflective surface. Techniques described herein include identifying physical objects within a physical environment that have reflections that are visible within a physical mirror, and presenting, within an HMD, artificial reality content overlaid on the reflections of those physical objects within the mirror.

In some examples, various types of virtual content may be presented through a mirror (including hats, other articles of clothing, and views of the user's room reflected back through the mirror), and such content may be positioned relative to a physical object in the room, or in some cases, "locked" to a moving user or to a body part (e.g., head, arm, foot) of a moving user. Touch interactions with the mirror may be used to for gating or interacting with a user interface menu. In response to such interactions, the artificial reality content presented as an overlay to reflections in the mirror may be modified or updated appropriately. In general, the mirror (or the area near the mirror) may be used to trigger, gate, or enable performance of certain operations, including presentation of a user interface (UI) to customize options relating to presented artificial reality content. For example, the UI might be used to select overlaid artificial reality content, enabling users to "try on" clothing or accessories or exchange such clothing or accessories with other users.

Techniques are also described for use of a physical mirror to perform specific computing operations. For instance, teleconferencing operations are described in which a user might look into a mirror and see both himself or herself and the remote person participating in the teleconference. The remote person may be presented as an avatar, presented normally, or presented as an image having overlaid virtual apparel (e.g., a hat). Where multiple users participate in the call, all users might simultaneously be visible within a mirror located within each user's physical environment. Touch interactions may enable exchange of digital content with other teleconference participants, or with other remote systems. As described herein, a mirror may serve as an intuitive point of reference for gating or triggering various operations involving multiple users.

In addition, techniques are described in which an artificial reality system uses a mirror for movement instruction, such as dance or exercise lessons, or for other instructions, such as those describing how to use a new product. In some examples, an artificial reality system may detect a series of movements made by a user, and compare those movements to a model set of movements. Based on the comparison, the artificial reality system may determine whether a user's movements might be improved or modified, and if so, artificial reality content may be presented to illustrate movements that more appropriately align with the model set of movements.

In some examples, this disclosure describes operations performed by an artificial reality system in accordance with one or more aspects of this disclosure. In one specific example, this disclosure describes a method comprising capturing image data representative of a physical environment, wherein the physical environment includes a reflective surface and a plurality of objects; determining, based on the image data, a map of the physical environment, wherein the map includes position information about a head-mounted display (HMD), the reflective surface, and each of the plurality of physical objects in the physical environment; identifying a visible object from among the plurality of physical objects, wherein the visible object is positioned so as to create a reflected image on the reflective surface; and generating artificial reality content, wherein the artificial reality content is generated for rendering at a position relative to the position of the visible object.

In another example, this disclosure describes a method comprising capturing image data representative of a physical environment that includes a reflective surface, a plurality of objects, and a head-mounted display (HMD) worn by a first user; determining, based on the image data, a map of the physical environment including position information about the HMD, the reflective surface, and each of the plurality of physical objects; determining, based on the position of the HMD and the reflective surface, that a reflected image of the first user is visible; identifying, from the image data, an input gesture performed by the first user; generating, responsive to the input gesture, artificial reality content that includes an image representing a second user; and enabling communication between the first user and the second user.

In another example, this disclosure describes a method comprising capturing, by an image capture system including a head-mounted display (HMD) worn by a user, image data representative of a physical environment, wherein the physical environment includes a reflective surface and the HMD; determining, based on the image data, a map of the physical environment, wherein the map includes position information about the reflective surface and the HMD; determining, based on the position information about the reflective surface and the HMD, that the user is visible as a reflected image in the reflective surface; identifying, from the image data, a series of movements performed by the user; and generating artificial reality content that illustrates a model set of movements that differ from the series of movements performed by the user.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
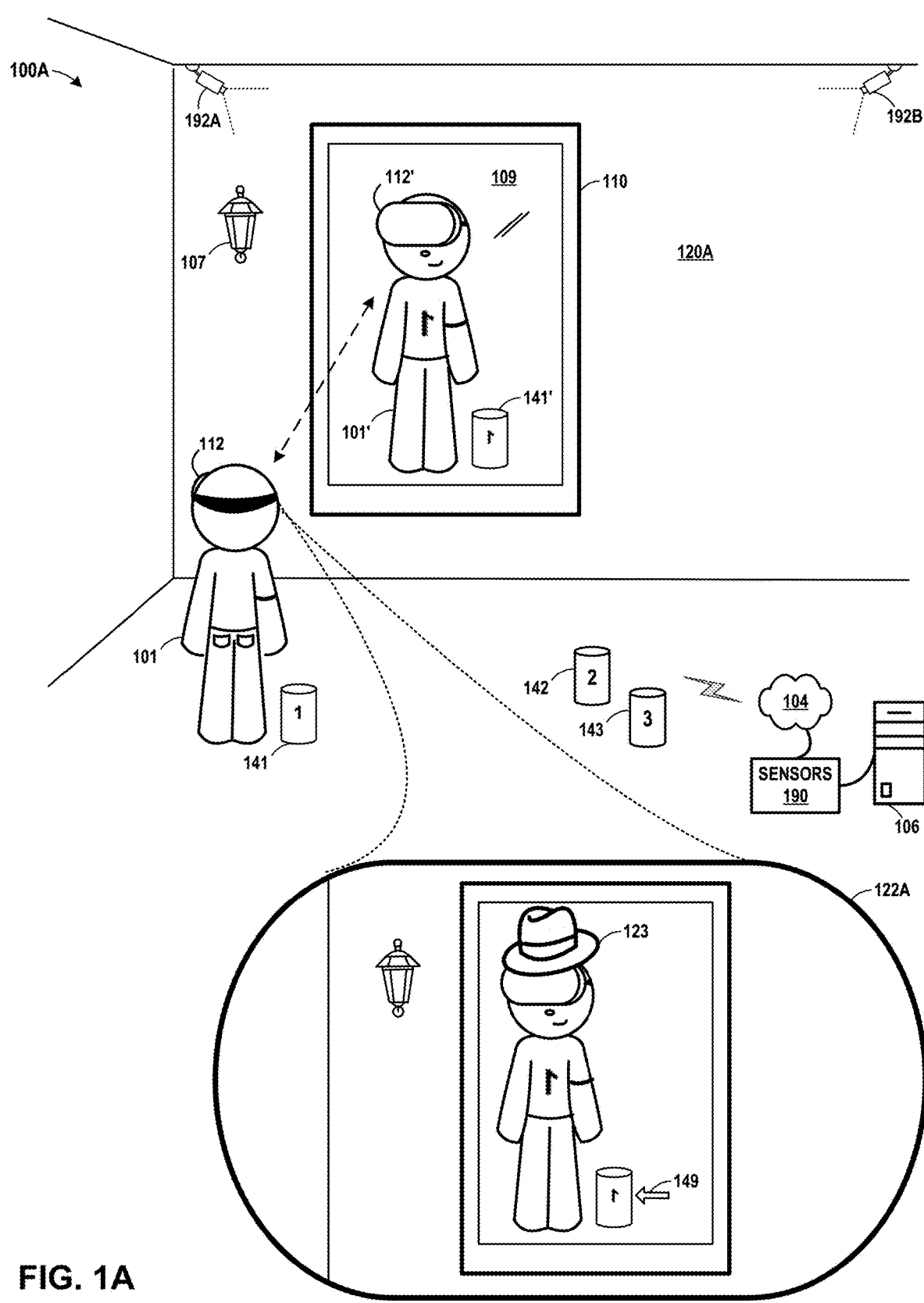
FIG. 1A is a conceptual diagram illustrating an example artificial reality system that generates artificial reality content associated with images reflected by a mirror, in accordance with one or more aspects of the present disclosure.

FIG. 1A is a conceptual diagram illustrating an example artificial reality system that generates artificial reality content associated with images reflected by a mirror, in accordance with one or more aspects of the present disclosure. In the example of FIG. 1A, artificial reality system 100A is depicted within physical environment 120A. In FIG. 1A, physical environment 120A is shown as a room that includes user 101 and a number of real world or physical objects, including HMD 112, lamp 107, mirror 109, frame 110, object 141, object 142, and object 143. User 101 is positioned within physical environment 120A near mirror 109, and in the example shown, user 101 is positioned such that he can see a reflection of himself (101') in mirror 109. Mirror 109 is mounted within mirror frame 110. User 101 is wearing a shirt having the numeral "1" on it and having a single stripe on the right sleeve. As would be expected, that numeral "1" and stripe are shown as a reflected (reversed) image in mirror 109. Similarly, because of the relative positions of user 101, HMD 112, and object 141 to mirror 109, user 101 can also see a reflection of HMD 112 (112') and object 141 (141') in mirror 109. Although examples described herein are principally described in terms of images reflected by a mirror, such examples may also be applicable to any reflective surface that tends to reflect images, such as a window or the like.

Object 141 includes two instances of the numeral "1" printed on it—one on a near-facing side of object 141 (shown in FIG. 1A) and another on a far-facing side of object 141. The numeral "1" on the far-facing side of object 141 is not directly visible in FIG. 1A, but since object 141 is positioned so that its image is reflected by mirror 109, the reflected image of the "1" printed on the far-facing side of object 141 is visible in mirror 109 (as 141'). Object 142 and object 143 also each have a numeral printed on two sides: object 142 has the numeral "2" printed on a near-facing side and a far-facing side of object 142, and object 143 has the numeral "3" printed on a near-facing side and a far facing-side of object 143. In the example of FIG. 1A, neither object 142 nor object 143 are visible in mirror 109, so only the numerals printed on the near-facing sides of object 142 and object 143 can be seen in FIG. 1A.

In FIG. 1A, artificial reality system 100A includes head-mounted display (HMD) 112, console 106, one or more sensors 190, and cameras 192A and 192B (collectively "cameras 192," representing any number of cameras). Although in some examples external sensors 190 and cameras 192 may be stationary devices (e.g., affixed to the wall), in other examples one or more of external sensors 190 and/or cameras 192 may be included within HMD 112, within a user device (not shown), or within any other device or system. As shown in FIG. 1A, HMD 112 is typically worn by user 101 and includes an electronic display and optical assembly for presenting artificial reality content 122A to the user. In addition, HMD 112 may include one or more sensors (e.g., accelerometers) for tracking motion of the HMD and may include one or more image capture devices, e.g., cameras, line scanners and the like, for capturing image data of the surrounding environment.

Artificial reality system 100A may use information obtained from a real-world or physical three-dimensional (3D) environment to render artificial reality content 122A for display by HMD 112, thereby presenting the content to user 101. In the example of FIG. 1A, user 101 views the artificial reality content 122A constructed and rendered by an artificial reality application executing on console 106 and/or HMD 112. As one example, artificial reality content 122 may include virtual hat 123 overlaid on an image of a reflection of user reflected by mirror 109. To implement such an effect, physical mirror 109 may be thought of as having a "virtual mirror" that is coincident with mirror 109 or in the map of the physical world at the same place as and with an orientation corresponding to an orientation of physical mirror 109.

In other examples, artificial reality content 122A may correspond to content rendered pursuant to a social interaction application, a video conferencing application, a movement instruction application, an alternative world application, a navigation application, an educational application, gaming application, training or simulation applications, augmented reality application, virtual reality application, or other type of applications that implement artificial reality.

In the example of FIG. 1A, console 106 is shown as a single computing device, such as a gaming console, workstation, a desktop computer, or a laptop. In other examples, console 106 may be distributed across a plurality of computing devices, such as a distributed computing network, a data center, or a cloud computing system. HMD 112, console 106, external sensors 190, and cameras 192, may, as shown in FIG. 1A, be communicatively coupled via network 104, which may be a wired or wireless network, such as Wi-Fi, a mesh network or a short-range wireless communication medium. In some examples, user 101 may use one or more controllers (not shown) to perform gestures or other actions. In such an example, such controllers may be in communication with HMD 112 using near-field communication or short-range wireless communication such as Bluetooth, using wired communication links, or using another type of communication links. Although HMD 112 is shown in FIG. 1A as being in communication with, e.g., tethered to or in wireless communication with, console 106, in some implementations HMD 112 operates as a stand-alone, mobile artificial reality system. As such, some or all functionality attributed to console 106 in this disclosure may be distributed among one or more user devices, such as one or more instances of HMD 112.

In some examples, an artificial reality application executing on console 106 and/or HMD 112 in FIG. 1A presents artificial reality content to user 101 based on a current viewing perspective for user 101. That is, in FIG. 1A, the artificial reality application constructs artificial content by tracking and computing pose information for a frame of reference for HMD 112, and uses data received from HMD 112, external sensors 190, and/or cameras 192 to capture 3D information within the real-word, physical 3D environment 122, such as motion by user 101 and/or tracking information with respect to user 101 and one or more physical objects, for use in computing updated pose information for a corresponding frame of reference of HMDs 112 (or another user device). As one example, the artificial reality application may render, based on a current viewing perspective determined for HMD 112, artificial reality content 122 having one or more artificial reality content objects overlaid upon images of reflected physical or real-world objects (e.g., user 101, object 141). Further, from the perspective of HMD 112, artificial reality system 100A renders artificial reality content based upon the estimated positions and poses for user 101 and other physical objects.

In the example of FIG. 1A, an in accordance with one or more aspects of the present disclosure, HMD 112 may present artificial reality content 122A to user 101. For instance, with reference to FIG. 1A, each of HMD 112, external sensors 190, and/or cameras 192 capture images within physical environment 120A. Console 106 receives such images and determines the position of physical objects within physical environment 120A, including user 101, HMD 112, and mirror 109. Console 106 determines the region of space reflected in mirror 109, and uses that information to identify which physical objects are, from the perspective of HMD 112, visible in mirror 109. In some examples, determining which physical objects are visible in mirror 109 may involve one or more of the techniques described below in connection with FIG. 5A, FIG. 5B, and/or FIG. 6. Typically, console 106 does not "find" physical objects in the room through the mirror, and as such, does not typically implement a simultaneous localization and mapping (SLAM) to detect the location of physical objects in a reflected image, and HMD 112 is not typically detected by the interaction with the mirror. Rather, HMD 112 may determine its position in the map and communicate that position to other HMDs, if any, through console 106 or otherwise. Further, in some examples, user 101 may define the location of mirror 109 manually through input.

In the example of FIG. 1A, console 106 determines that reflected images of user 101 and object 141 are visible in mirror 109. Console 106 generates artificial reality content 122A, and includes virtual hat 123 at a position that is determined based on the location, within physical environment 120A, of HMD 112. In some examples, virtual hat 123 is "locked" (or substantially locked) to the head of user 101 or to HMD 112 so that when the head of user 101 or when HMD 112 moves, the appropriate position of virtual hat 123 on the reflected image of the head of user 101 would also move. In some examples, "substantially locked" may mean that the hat 123 may move relative to head of user 101 slightly in response to movements of user 101, just as a physical hat might move slightly in response to such movements. Hat 123 might also fall off of the head of user 101 if user 101 moved abruptly, again just as a physical hat would fall of the head of user 101 in such a situation. In other examples, however, "substantially locked" may encompass any positioning of an artificial reality element that is based in some way on the underlying physical object, and alternatively, or in addition, may encompass dynamic content that is not tightly locked but may be organic in its movement and distance from the user.

Similarly, object 141 is presented within artificial reality content 122A having an artificial reality arrow 149 next to it. Console 106 causes virtual hat 123 and arrow 149 to be overlaid on images of physical objects captured within 100A. Console 106 causes HMD 112 to present artificial reality content 122A to user 101 within HMD 112 in the manner shown in FIG. 1A. Although virtual hat 123 is illustrated and described as anchored or attached to the head of user 101 or to HMD 112, virtual hat 123 could be presented anywhere in the physical reflection, attached to a physical object or not attached to a physical object. Similarly, arrow 149 might be anchored to object 141 such that if object 141 were moved or overturned, arrow 149 would move within artificial reality content 122A appropriately. In other examples, however, arrow 149 might not be anchored to object 141, so that its position might not be affected by movements of object 141.

Artificial reality content described herein may take any form, beyond virtual hat 123, arrow 149, and other content presented in other illustrations. For instance, such content may include any article of clothing (e.g., locked to a watch, hand, shoulder, etc.) or augmentation, and could encompass any two-dimensional or three-dimensional static or dynamic content. Further, such artificial reality content could include masking out physical objects in the mirror, so that console 106 or HMD 112 effectively removes the presence of physical object(s) in the mirror reflection (e.g., a vampire might not cast a reflection in a mirror).

Further, although only one user 101 is illustrated in FIG. 1A (and in some of the other illustrations herein), multiple users, each wearing an HMD 112, may be present in a room with one (or more) mirrors. In such an example, each of the users may be presented with augmentations similar to those described in connection with user 101. Where there are multiple HMDs, there may be a number of different ways to track physical and/or virtual content for the HMDs. In one example, one system of sensors (e.g., sensors 190 and 192) could perform the tracking, and communicate the results to each of the HMDs. In another example, each HMD may have its own map and track itself, and also communicate information about its map and/or tracking to other HMDs. In another example, HMDs, may track recognized objects, and can communicate those locations to other HMDs.

Figure 1B:
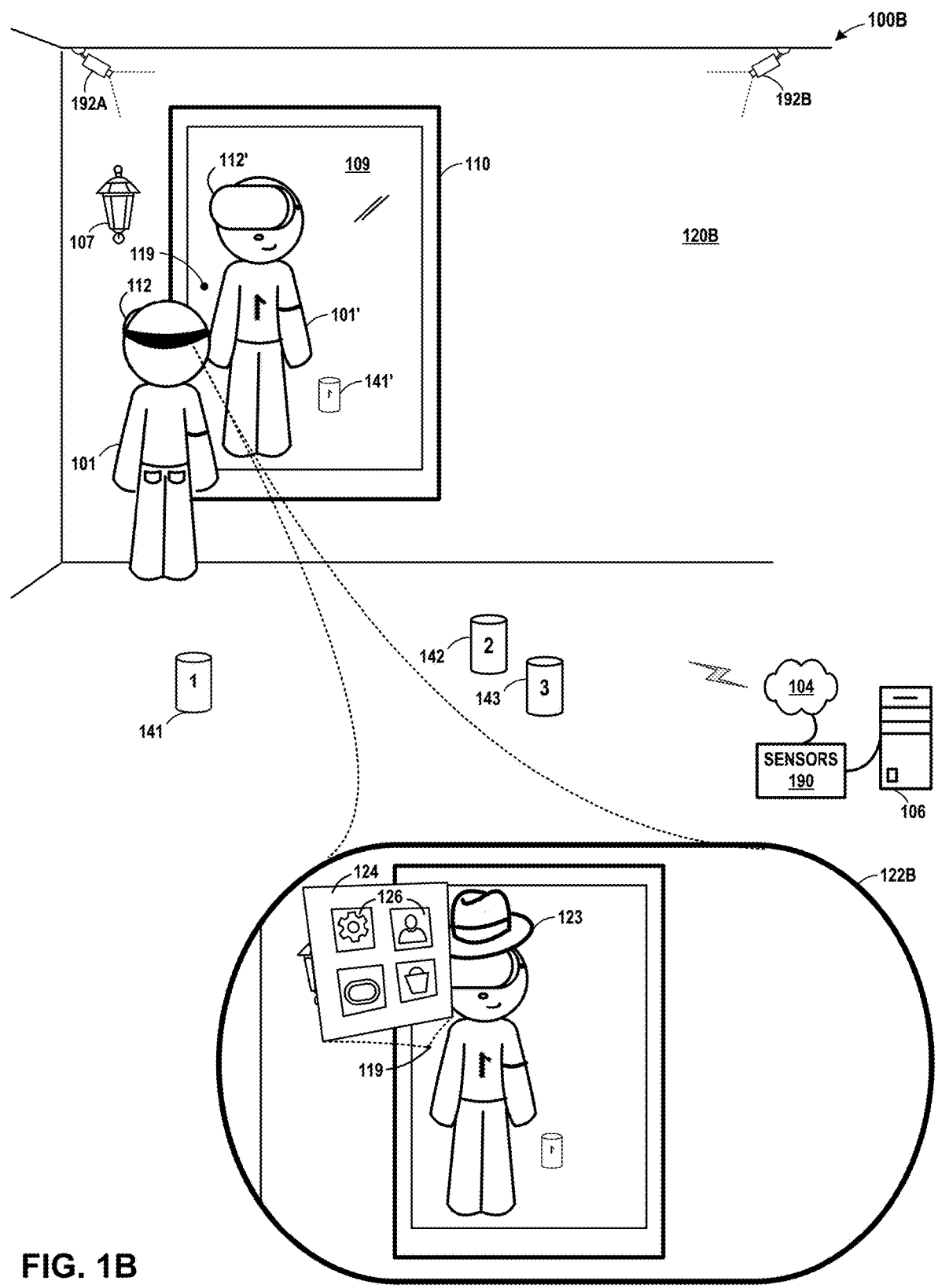
FIG. 1B is a conceptual diagram illustrating an example artificial reality system that generates a user interface when presenting artificial reality content associated with images reflected by a mirror, in accordance with one or more aspects of the present disclosure.

FIG. 1B is a conceptual diagram illustrating an example artificial reality system that generates a user interface when presenting artificial reality content associated with images reflected by a mirror, in accordance with one or more aspects of the present disclosure. In the example of FIG. 1B, artificial reality system 100B is depicted within physical environment 120B, and physical environment 120B is again shown as a room that includes user 101 and a number of physical objects. In the example of FIG. 1B, artificial reality system 100B includes many of the same elements described in connection with FIG. 1A, and elements illustrated in FIG. 1B may correspond to elements illustrated in FIG. 1A that are identified by like-numbered reference numerals in FIG. 1A. In general, such like-numbered elements may be implemented in a manner consistent with the description of the corresponding element provided in connection with FIG. 1A or elsewhere herein, although in some examples, such elements may involve alternative implementation with more, fewer, and/or different capabilities and attributes. Accordingly, artificial reality system 100B of FIG. 1B may be described as an alternative example or implementation of artificial reality system 100A of FIG. 1A.

In FIG. 1B, user 101 is slightly closer to mirror 109 and is reflected in mirror 109. Object 141 is behind user 101 and is also reflected in mirror 109. In FIG. 1B, user 101 is close enough to mirror 109 to reach mirror 109 with a hand.

In the example of FIG. 1B, and in accordance with one or more aspects of the present disclosure, HMD 112 may present a user interface. For instance, with reference to FIG. 1B, HMD 112, external sensors 190, and/or cameras 192 capture images within physical environment 120B. Console 106 determines that user 101 is physically positioned in front of mirror 109. Responsive to determining that user 101 is positioned in front of mirror 109, console 106 generates artificial reality content 122B, and includes user interface menu 124 within artificial reality content 122B. In the example of FIG. 1B, user interface menu 124 further includes user interface elements 126. Console 106 causes artificial reality content 122B to be presented to user 101 within HMD 112. In the example described, artificial reality content 122B may be presented to user 101 within HMD 112 simply in response to detecting that user 101 is positioned in front of mirror 109.

In another example, HMD 112 may present a user interface in response to user input. For instance, again referring to FIG. 1B, each of HMD 112, external sensors 190, and/or cameras 192 capture images within physical environment 120B. Console 106 determines that the motion and/or images indicate that user 101 has touched mirror 109 at touch point 119. Console 106 further determines that such a motion is a gesture that gates or triggers presentation of a user interface. Console 106 generates artificial reality content 122B and includes user interface menu 124 within artificial reality content 122B. Although the input described above may involve direct touching of mirror 109, in other examples, such input may include or may be an at-a-distance interaction with mirror 109.

In the example of FIG. 1B, user interface menu 124 further includes user interface elements 126. Console 106 may detect interaction with user interface menu 124 and/or user interface elements 126 and in response, perform one or more operations. For instance, in some examples, console 106 may detect that user 101 has interacted with user interface menu 124 to change the appearance of virtual hat 123 (or to remove virtual hat 123). In response to such interactions, console 106 may update artificial reality content 122B appropriately. User 101 may also interact with user interface menu 124 to change other articles of clothing or to customize other content being presented. In some examples, interactions with user interface menu 124 may cause modifications to the artificial reality content presented through HMD 112, which would then apply to the physical world's virtual content based on the chosen modifications.

In still other examples, presentation of user interface menu 124 might not be necessary to perform the described or other operations. For instance, user 101 may perform a swiping motion to change the appearance of virtual hat 123 (e.g., to change hats), or to change other articles of clothing that may be overlaid on images of user 101. In another example, user 101 may perform gestures (e.g., hand gestures) that may have a particular meaning when performed in front of mirror 109 or in front of another mirror.

Figure 1C:
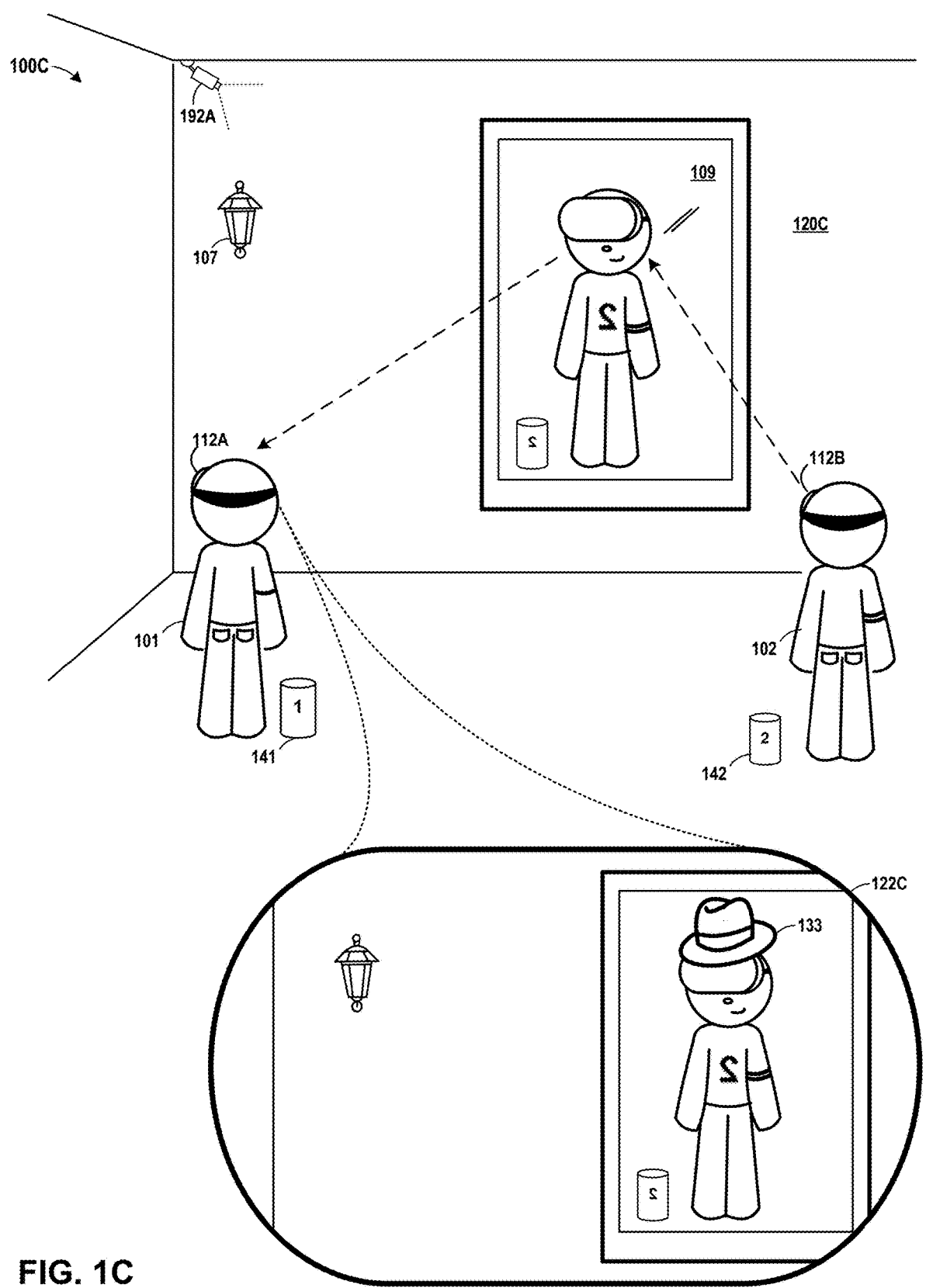
FIG. 1C is a conceptual diagram illustrating an example artificial reality system that generates artificial reality content associated with images of another user reflected by a mirror, in accordance with one or more aspects of the present disclosure.

FIG. 1C is a conceptual diagram illustrating an example artificial reality system that generates artificial reality content associated with images of another user reflected by a mirror, in accordance with one or more aspects of the present disclosure. In the example of FIG. 1C, artificial reality system 100C is depicted within physical environment 120C, and physical environment 120C is shown as a room having a slightly different configuration or arrangement than those of FIG. 1A or FIG. 1B. In FIG. 1C, physical environment 120C includes mirror 109, but includes both user 101 and user 102, along with object 141 and object 142. In FIG. 1C, user 101 wears HMD 112A, and user 102 wears HMD 112B, where HMD 112A and HMD 112B may have similar capabilities.

However, as in FIG. 1B, artificial reality system 100C includes many of the same elements described in connection with FIG. 1A and FIG. 1B, and elements illustrated in FIG. 1C may correspond to elements illustrated in FIG. 1A and/or FIG. 1B that are identified by like-numbered reference numerals. As explained in connection with FIG. 1B, such like-numbered elements may be implemented in a manner consistent with the description of the corresponding element provided in connection with FIG. 1A or elsewhere herein, although in some examples, such elements may involve alternative implementation with more, fewer, and/or different capabilities and attributes. Accordingly, artificial reality system 100C of FIG. 1C may be described as an alternative example or implementation of artificial reality system 100A of FIG. 1A or artificial reality system 100B of FIG. 1B.

In the example of FIG. 1C, and in accordance with one or more aspects of the present disclosure, HMD 112A may present artificial reality content 122C that includes content locked to the head of another user. For instance, with reference to FIG. 1C, each of HMD 112A, HMD 112B, external sensors 190, and/or cameras 192 capture images within physical environment 120A. Console 106 (see FIG. 1A or 1B) receives such images and determines the position of physical objects within physical environment 120A, including user 101, HMD 112A, HMD 112B, and mirror 109. Console 106 determines which physical objects are, from the perspective of HMD 112A, visible in mirror 109. In the example of FIG. 1C, console 106 determines that images of user 102 and object 142 are visible in mirror 109. Console 106 generates artificial reality content 122C, and includes virtual hat 133 at a position that is determined based on the location of the head of user 102. Console 106 causes HMD 112A to present artificial reality content 122C to user 101 in the manner shown in FIG. 1C.

In some examples, virtual hat 133 may be locked to a position that is determined based on the location of HMD 112B, rather than user 102. In such an example, user 102 removing HMD 112B and handing HMD 112B to another user may appear, to user 101 viewing this sequence of events through HMD 112A, that user 102 is removing virtual hat 133 and handing virtual hat 133 to the other user.

In still other examples, console 106 may present artificial reality content that is locked or presented relative to other physical objects within physical environment 120C. In such examples, console 106 may present themed versions of physical environment 120C, such that user 101 may look at images reflected by mirror 109 and see versions of physical objects within physical environment 120C that represent that a theme (e.g. western theme, or a theme based on another part of the world, or a "parallel universe" version of physical environment 120C). For instance, user 101 may be in his bedroom, and may look into mirror 109 and see the same bedroom but with a "western" theme. In response to user input selecting a theme (e.g., selecting a theme being previewed by looking in the mirror), the chosen 3D content appears in the 3D physical space of the room occupied by user 101, and user 101 can now view directly the selected theme in the physical space, without having to look in mirror 109. In some examples, the western theme might change a shoe on the floor in the user's room to a cowboy boot, or change a baseball hat hanging on a hook in the user's room to a cowboy hat. Also, in some examples, the western theme might add objects to the user's room that might be expected to be found in a western-style room or in a room augmented for the chosen theme.

In another example that presents a "parallel universe" version of physical environment 120C, user 101 may be presented with a user interface enabling user 101 to "travel" to the parallel universe, which may involve applying appropriate virtual clothing content to that user's appearance (e.g., to the user's reflections in mirror 109) and to the appearance of any other users in the room.

Techniques described herein may enable use of an artificial reality system to know who else is sharing the same artificial reality experience as that user. One way in which such a shared experience may be indicated is through an artificial reality augmentation (e.g., a distinctive hat) that may be visible to other users in that experience. A hat or other article of clothing chosen or otherwise worn by a user may have a particular meaning, which may depend on the community or context in which the hat is worn. Such content may be customizable by the user through interactions with a user interface. A hat or other article of clothing may animate or make a sound when the person walks or moves, or based on the person's posture (e.g., a Santa hat with a bell on the end). Hats or other accessories may be presented based on available space or based on attributes of the physical environment (e.g., particular hats available only in high-ceiling rooms). Such articles of clothing or other digital enhancements that might be locked to the user's position (e.g., substantially locked to the user's head) may be used in various artificial reality experiences to signify attributes of a user, such as where that user was, where he or she currently is, what that user knows or has created, or what role such a user is serving or performing.

In other examples, techniques described herein may be used in connection with a social event where users are able to choose (e.g., on an opt-in basis) an artificial reality party hat that is visible only when that user is in a designated space for that social event. Such a hat might disappear or not be visible when the user is outside that designated space. Where multiple users are in front of a mirror, a user interface might be presented enabling hats or other content to be changed for multiple users at the same time. In some examples, hats might be randomized or chosen from a set of hats based on the number of users present in front of the mirror or based on the time of year or other event. In one example that might occur during Christmas season, one user from among many may be chosen to wear a Santa hat, and the remaining users might be outfitted with elf hats. In another example where a music concert is on a relevant user's schedule, virtual hats and/or accessories may be chosen based on the type of music to be played at the concert or the band performing at concert.

Although techniques described herein are primarily described in terms of a physical mirror that is affixed to a wall, techniques described herein may be applicable in other situations. For example, a personal mirror (e.g., a small hand-held mirror) may be used for similar effects. In the examples of FIG. 1A, FIG. 1B, and FIG. 1C, for instance, external sensors 190, cameras 192, and HMDs 112 may track the position of such a mirror and the movements of such a mirror. Such a portable mirror might also be configured with inertial measurement devices or sensors that enable tracking. In one example, a portable mirror may be a mobile device (e.g., a mobile phone) that allows a user to see him or herself using a forward-facing camera.

Figure 2:
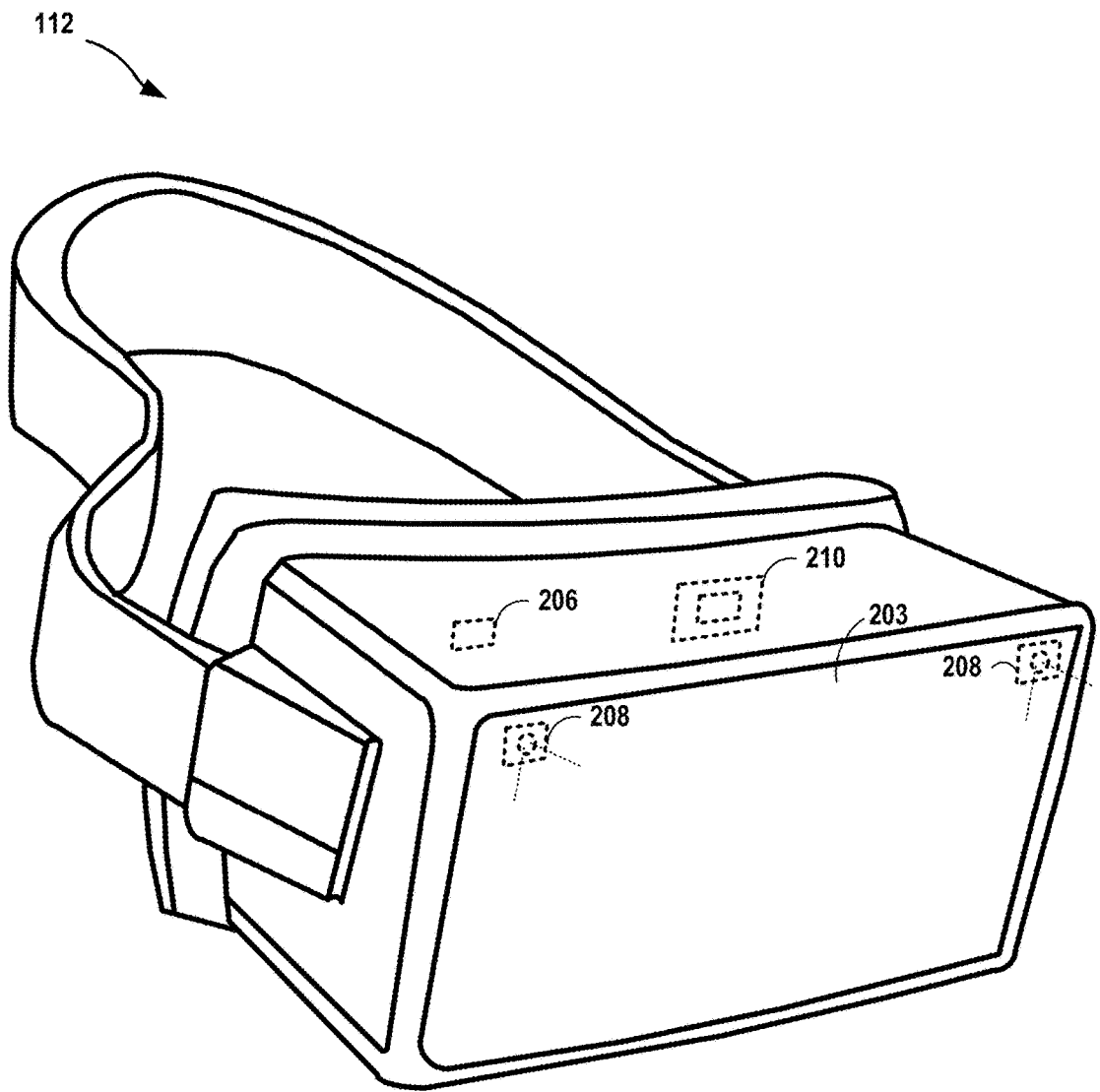
FIG. 2 is an illustration depicting an example head-mounted display configured to operate in accordance with the techniques of the disclosure.

FIG. 2 is an illustration depicting an example HMD 112 configured to operate in accordance with the techniques of the disclosure. HMD 112 of FIG. 2 may be an example of any HMD 112 of FIG. 1A, FIG. 1B, and/or FIG. 1C. HMD 112 may be part of an artificial reality system, such as artificial reality systems 100A, 100B, or 100C, or may operate as a stand-alone, mobile artificial realty system configured to implement the techniques described herein. HMD 112 may include a mobile device (e.g., a smart phone) that is removable from the body of the HMD 112.

In the example of FIG. 2, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

In the example of FIG. 2, HMD 112 further includes one or more sensors 206, such as one or more accelerometers (also referred to as inertial measurement units or "IMUs")

that output data indicative of current acceleration of HMD 112, GPS sensors that output data indicative of a location of HMD 112, radar or sonar sensors that output data indicative of distances of the HMD 112 from various objects, or other sensors that provide indications of a location or orientation of HMD 112 or other objects within a physical 3D environment. Moreover, HMD 112 may include one or more integrated sensor devices 208, such as a microphone, audio sensor, a video camera, laser scanner, Doppler radar scanner, depth scanner, or the like, configured to output audio or image data representative of a surrounding real-world environment. HMD 112 includes an internal control unit 210, which may include an internal power source and one or more printed-circuit boards having one or more processors, memory, and hardware to provide an operating environment for executing programmable operations to process sensed data and present artificial-reality content on display 203. Internal control unit 210 may be part of a removable computing device, such as a smart phone.

Although illustrated in FIG. 2 having a specific configuration and structure, HMD 112 may take any of a number of forms. For example, in some implementations, HMD 112 might resemble glasses or may have a different form. Also, although HMD 112 may be configured with a display 203 for presenting representations or images of physical content, in other examples, HMD 112 may include a transparent or partially transparent viewing lens, enabling see-through artificial reality (i.e., "STAR"). Further, HMD may implement features based on wave guides or other STAR technologies.

In accordance with the techniques described herein, control unit 210 is configured to present content within the context of a physical environment that includes one or more mirrors. For example, HMD 112 may compute, based on sensed data generated by motion sensors 206 and/or audio and image data captured by sensor devices 208, a current pose for a frame of reference of HMD 112. Control unit 210 may include a pose tracking unit, which can execute software for processing the sensed data and/or images to compute the current pose. Control unit 210 may store a master 3D map for a physical environment and compare processed images to the master 3D map to compute the current pose. Alternatively, or additionally, control unit 210 may compute the current pose based on sensor data generated by sensors 206. Based on the computed current pose, control unit 210 may render artificial reality content corresponding to the master 3D map for an artificial reality application, and control unit 210 may display the artificial reality content via the electronic display 203.

As another example, control unit 210 may generate mapping information for the physical 3D environment in which the HMD 112 is operating and send, to a console or one or more other computing devices (such as one or more other HMDs), via a wired or wireless communication session(s), the mapping information. In this way, HMD 112 may contribute mapping information for collaborate generation of the master 3D map for the physical 3D environment. Mapping information may include images captured by sensor devices 208, tracking information in the form of indications of the computed local poses, or tracking information that provide indications of a location or orientation of HMD 112 within a physical 3D environment (such as sensor data generated by sensors 206), for example.

In some examples, in accordance with the techniques described herein, control unit 210 may peer with one or more controllers for HMD 112 (controllers not shown in FIG. 2). Control unit 210 may receive sensor data from the controllers that provides indications of user inputs or controller orientations or locations within the physical 3D environment or relative to HMD 112. Control unit 210 may send representations of the sensor data to a console for processing by the artificial reality application, where the indications may be event data for an artificial reality application. Control unit 210 may execute the artificial reality application to process the sensor data.

Figure 3:
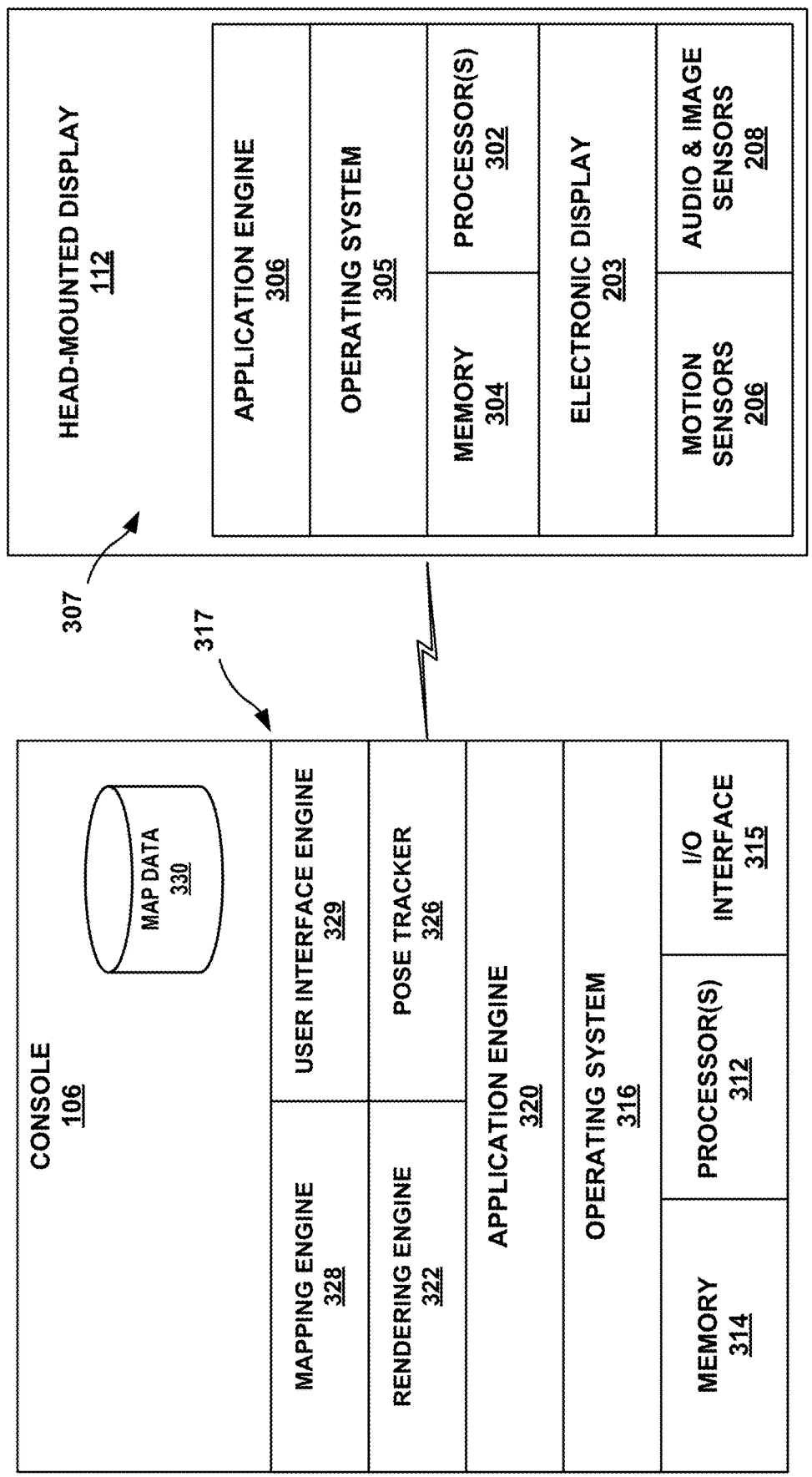
FIG. 3 is a block diagram showing example implementations of an example console and an example HMD, in accordance with one or more aspects of the present disclosure.

FIG. 3 is a block diagram showing example implementations of an example console and an example HMD, in accordance with one or more aspects of the present disclosure. Although the block diagram illustrated in FIG. 3 is described with reference to HMD 112, in other examples, functions and/or operations attributed to HMD 112 may be performed by a different device or system, such as a user device as referenced in connection with FIG. 1A.

In the example of FIG. 3, HMD 112 includes one or more processors 302 and memory 304 that, in some examples, provide a computer platform for executing an operation system 305, which may be an embedded and near (or seemingly-near) real-time multitasking operating system. In turn, operating system 305 provides a multitasking operating environment for executing one or more software components 307. Processors 302 are coupled to electronic display 203 (see FIG. 2). HMD 112 is shown including motion sensors 206 and sensor devices 208 coupled to processor 302, but in other examples, HMD 112 may include neither or merely either of motion sensors 206 and sensor devices 208. In some examples, processors 302 and memory 304 may be separate, discrete components. In other examples, memory 304 may be on-chip memory collocated with processors 302 within a single integrated circuit. The memory 304, processors 302, operating system 305, and application engine 340 components may collectively represent an example of internal control unit 210 of FIG. 2.

HMD 112 may include user input devices, such as a touchscreen or other presence-sensitive screen example of electronic display 203, microphone, controllers, buttons, keyboard, and so forth. Application engine 340 may generate and present a login interface via electronic display 203. A user of HMD 112 may use the user interface devices to input, using the login interface, login information for the user. HMD 112 may send the login information to console 106 to log the user into the artificial reality system.

Operating system 305 provides an operating environment for executing one or more software components, which include application engine 306, which may be implemented as any type of appropriate module. Application engine 306 may be an artificial reality application having one or more processes. Application engine 306 may send, to console 106 as mapping information using an I/O interface (not shown in FIG. 3) via a network or other communication link, representations of sensor data generated by motion sensors 206 or images generated by sensor devices 208. The artificial reality application may be, e.g., a teleconference application, a gaming application, a navigation application, an educational application, or training or simulation application, for example.

Console 106 may be implemented by any suitable computing system capable of interfacing with user devices (e.g., HMDs 112) of an artificial reality system. In some examples, console 106 interfaces with HMDs 112 to augment content that may be reflected in a mirror, or to present artificial reality content triggered by an action or gesture performed in a particular location relative to the mirror. In some examples, console 106 generates, based at least on mapping information received from one or more HMDs 112, external sensors 190, and/or cameras 192, a master 3D map of a physical 3D environment in which users, physical devices, one or more mirrors, and other physical objects are located. In some examples, console 106 is a single computing device, such as a workstation, a desktop computer, a laptop. In some examples, at least a portion of console 106, such as processors 352 and/or memory 354, may be distributed across one or more computing devices, a cloud computing system, a data center, or across a network, such as the Internet, another public or private communications network, for instance, broadband, cellular, Wi-Fi, and/or other types of communication networks, for transmitting data between computing systems, servers, and computing devices.

In the example of FIG. 3, console 106 includes one or more processors 312 and memory 314 that provide a computer platform for executing an operating system 316. In turn, operating system 316 provides an operating environment for executing one or more software components 317. Processors 312 are coupled to I/O interface 315, which provides one or more I/O interfaces for communicating with external devices, such as a keyboard, game controllers, display devices, image capture devices, and the like. Moreover, I/O interface 315 may include one or more wired or wireless network interface cards (NICs) for communicating with a network, such as network 104 (see, e.g., FIG. 1A). Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read-only memory (ROM), programmable read-only memory (PROM), erasable programmable read-only memory (EPROM), electronically erasable programmable read-only memory (EEPROM), and/or Flash memory. Software components 317 of console 106 operate to provide an overall artificial reality application. In the example of FIG. 3, software components 317 be represented by modules as described herein, including application engine 320, rendering engine 322, pose tracker 326, mapping engine 328, and user interface engine 329.

Application engine 320 includes functionality to provide and present an artificial reality application, e.g., a teleconference application, a gaming application, a navigation application, an educational application, training or simulation applications, and the like. Application engine 320 and application engine 340 may cooperatively provide and present the artificial reality application in some examples. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Rendering engine 322 renders the artificial content constructed by application engine 320 for display to user 101 in accordance with current pose information for a frame of reference, typically a viewing perspective of HMD 112, as determined by pose tracker 326. Based on the current viewing perspective, rendering engine 322 constructs the 3D, artificial reality content which may be overlaid, at least in part, upon the physical 3D environment in which HMD 112 is located. During this process, pose tracker 326 may operate on sensed data received from HMD 112, such as movement information and user commands, and, in some examples, data from external sensors 190 and/or cameras 192 (as shown in FIG. 1A, FIG. 1B, and FIG. 1C) to capture 3D information within the physical 3D environment, such as motion by HMD 112, a user thereof, a controller, and/or feature tracking information with respect to the user thereof.

Pose tracker 326 determines information relating to a pose of a user within an physical environment. For example, console 106 may receive mapping information from HMD 112, and mapping engine 328 may progressively generate a map for an area in which HMD 112 is operating over time, HMD 112 moves about the area. Pose tracker 326 may localize HMD 112, using any of the aforementioned methods, to the map for the area. Pose tracker 326 may also attempt to localize HMD 112 to other maps generated using mapping information from other user devices. At some point, pose tracker 326 may compute the local pose for HMD 112 to be in an area of the physical 3D environment that is described by a map generated using mapping information received from a different user device. Using mapping information received from HMD 112 located and oriented at the computed local pose, mapping engine 328 may join the map for the area generated using mapping information for HMD 112 to the map for the area generated using mapping information for the different user device to close the loop and generate a combined map for the master 3D map. Mapping engine 328 stores such information as map data 330. Based sensed data collected by external sensors 190, cameras 192, HMD 112, or other sources, pose tracker 326 determines a current pose for the frame of reference of HMD 112 and, in accordance with the current pose, provides such information to application engine 320 for generation of artificial reality content. That artificial reality content may then be communicated to HMD 112 for display to the user via electronic display 203.

Mapping engine 328 may be configured to generate maps of a physical 3D environment using mapping information received from user devices. Mapping engine 328 may receive the mapping information in the form of images captured by sensor devices 208 at local poses of HMD 112 and/or tracking information for HMD 112, for example. Mapping engine 328 processes the images to identify map points for determining topographies of the scenes in the images and use the map points to generate map data that is descriptive of an area of the physical 3D environment in which HMD 112 is operating. Map data 330 may include at least one master 3D map of the physical 3D environment that represents a current best map, as determined by mapping engine 328 using the mapping information.

Mapping engine 328 may receive images from multiple different user devices operating in different areas of a physical 3D environment and generate different maps for the different areas. The different maps may be disjoint in that the maps do not, in some cases, overlap to describe any of the same areas of the physical 3D environment. However, the different maps may nevertheless be different areas of the master 3D map for the overall physical 3D environment.

Pose tracker 326 determines information relating to a pose of a user within an physical environment. For example, console 106 may receive mapping information from HMD 112, and mapping engine 328 may progressively generate a map for an area in which HMD 112 is operating over time, HMD 112 moves about the area. Pose tracker 326 may localize HMD 112, using any of the aforementioned methods, to the map for the area. Pose tracker 326 may also attempt to localize HMD 112 to other maps generated using mapping information from other user devices. At some point, pose tracker 326 may compute the local pose for HMD 112 to be in an area of the physical 3D environment that is described by a map generated using mapping information received from a different user device. Using mapping information received from HMD 112 located and oriented at the computed local pose, mapping engine 328 may join the map for the area generated using mapping information for HMD 112 to the map for the area generated using mapping information for the different user device to close the loop and generate a combined map for the master 3D map. Mapping engine 328 stores that maps as map data 330. Based sensed data collected by external sensors 190, cameras 192, HMD 112, or other sources, pose tracker 326 determines a current pose for the frame of reference of HMD 112 and, in accordance with the current pose, provides such information to application engine 320 for generation of artificial reality content. That artificial reality content may then be communicated to HMD 112 for display to the user via electronic display 203.

Mapping engine 328 may use mapping information received from HMD 112 to update the master 3D map, which may be included in map data 330. Mapping engine 328 may, in some examples, determine whether the mapping information is preferable to previous mapping information used to generate the master 3D map. For example, mapping engine 328 may determine the mapping information is more recent in time, of higher resolution or otherwise better quality, indicates more or different types of objects, has been generated by a user device having higher resolution localization abilities (e.g., better inertial measurement unit or navigation system) or better optics or greater processing power, or is otherwise preferable. If preferable, mapping engine 328 generates an updated master 3D map from the mapping information received from HMD 112. Mapping engine 328 in this way progressively improves the master 3D map.

In some examples, mapping engine 328 may generate and store health data in association with different map data of the master 3D map. For example, some map data may be stale in that the mapping information used to generate the map data was received over an amount of time ago, or the map data may be of poor quality in that the images used to the generate the map data were poor quality (e.g., poor resolution, poor lighting, etc.). These characteristics of the map data may be associated with relatively poor health. Contrariwise, high quality mapping information would be associated with relatively good health. Health values for map data may be indicated using a score, a descriptor (e.g., "good", "ok", "poor"), a date generated, or other indicator. In some cases, mapping engine 328 may update map data of the master 3D map for an area if the health for the map data satisfies a threshold health value (e.g., is below a certain score). If the threshold health value is satisfied, mapping engine 328 generates an updated area for the area of the master 3D map using the mapping information received from HMD 112 operating in the area. Otherwise, mapping engine 328 discards the mapping information.

In some examples, map data 330 includes different master 3D maps for different areas of a physical 3D environment. Pose tracker 326 may localize HMD 112 to a location in one of the areas using images received from HMD 112. In response, application engine 320 may select the master 3D map for the area within which pose tracker 326 localized HMD 112 and send the master 3D map to HMD 112 for use in the artificial reality application. Consequently, HMD 112 may generate and render artificial reality content using the appropriate master 3D map for the area in which HMD 112 is located.

In some examples, map data includes different master 3D maps for the same area of a physical 3D environment, the different master 3D maps representing different states of the physical environment. For example, a first master 3D map may describe an area at a first time e.g., August 2015, while a second master 3D map may describe the area at a second time, e.g., October 2016. Application engine 320 may determine to use the first master 3D map responsive to a request from the user or responsive to a trigger within an artificial reality application, for instance. The mapping engine 328 may indicate in map data 330 that the first master 3D map is the master 3D map that is to be used for rendering artificial reality content for an artificial reality application. In this way, an artificial reality system including console 106 can render artificial reality content using historical map data describing a physical 3D environment as it appeared in earlier times. This technique may be advantageous for education-related artificial reality applications, for instance.

User interface engine 329 may perform functions relating to generating a user interface when a user is in close proximity to mirror 109 and/or when a user performs a gesture or action (e.g., touching the surface of mirror 109). User interface engine 329 may receive information from application engine 320, pose tracker 326, and/or mapping engine 328 and based on that information, generate a user interface (e.g., user interface menu 124 having user interface elements 126). User interface engine 329 may output, to rendering engine 322, information about the user interface so that rendering engine 322 may present the user interface, overlaid on other physical and/or artificial reality content, at display 203 of HMD 112. Accordingly, user interface engine 329 may receive information from and output information to one or more other modules, and may otherwise interact with and/or operate in conjunction with one or more other engines or modules of console 106.

In some examples, such as in the manner described in connection with FIG. 4, some or all of the functionality attributed to pose tracker 326, rendering engine 322, configuration interface 332, classifier 324, and application engine 320 may be performed by HMD 112.

Figure 4:
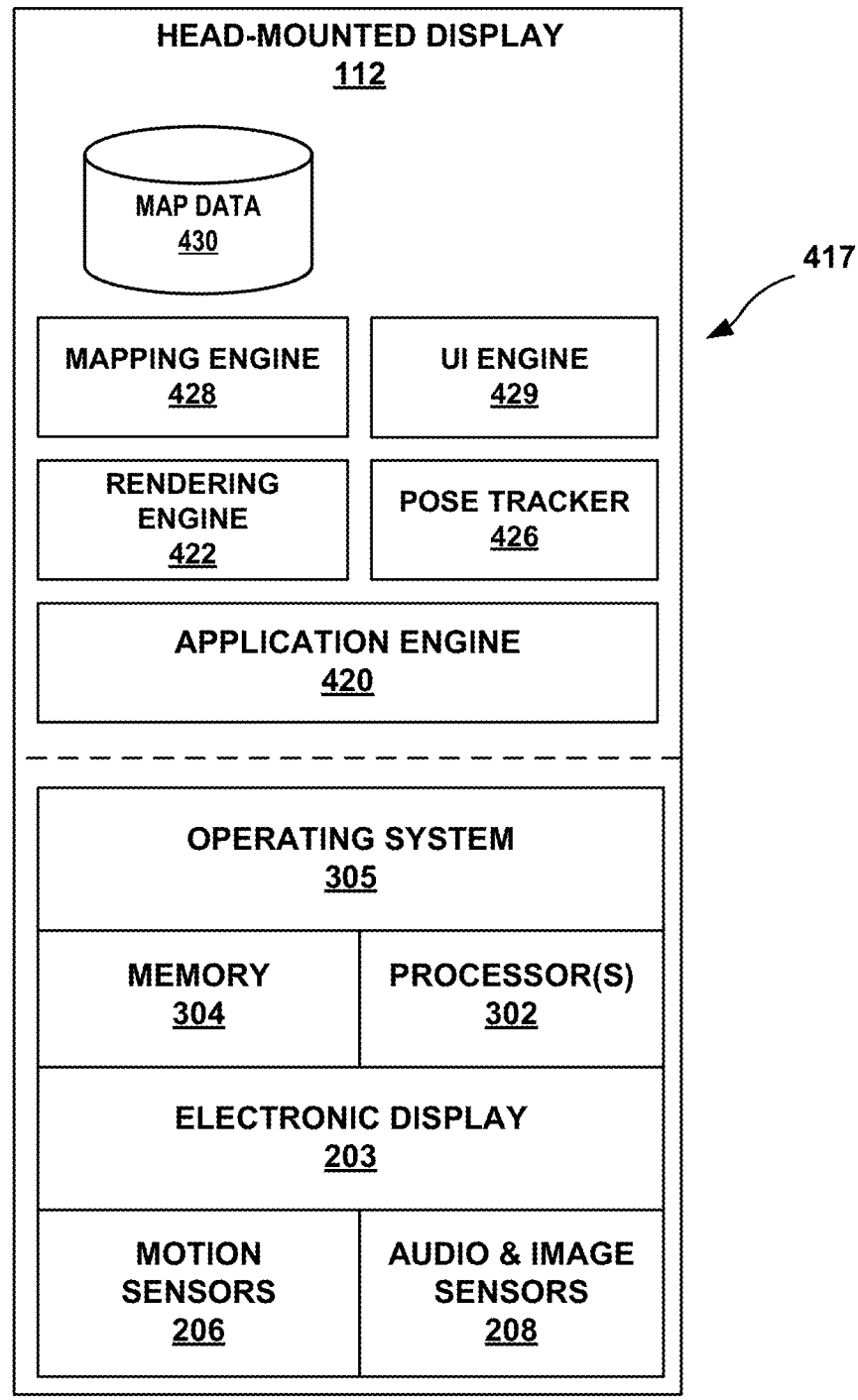
FIG. 4 is a block diagram depicting an example of a user device for an artificial reality system, in accordance with one or more aspects of the present disclosure.

Modules or engines illustrated in FIG. 3 (e.g., operating system 316, application engine 320, rendering engine 322, pose tracker 326, mapping engine 328, user interface engine 329, operating system 305, and application engine 306), FIG. 4, and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 4 is a block diagram depicting an example of a user device for an artificial reality system, in accordance with one or more aspects of the present disclosure. In FIG. 4, HMD 112 may operate as a stand-alone device, i.e., not tethered to a console, and may represent an instance of any of the user devices, including HMDs 112 described in connection with FIG. 1A, FIG. 1B, and FIG. 1C. Although device 112 illustrated in FIG. 4 is primarily described as a head-mounted device, the device illustrated in FIG. 4 may, in other examples, be implemented as a different device, such as tablet computer, for instance. In the specific example of FIG. 4, however, and in a manner similar to FIG. 3, HMD 112 includes one or more processors 302 and memory 304 that, in some examples, provide a computer platform for executing an operation system 305, which may be an embedded multitasking operating system. In turn, operating system 305 provides an operating environment for executing one or more software components 417. Moreover, processor(s) 302 are coupled to electronic display 203, motion sensors 206, and sensor devices 208.

In the example of FIG. 4, software components 417 operate to provide an overall artificial reality application. In this example, software components 417 include application engine 420, rendering engine 422, pose tracker 426, mapping engine 428, and user interface (UI) engine 429. In various examples, software components 417 operate similar to the counterpart components of console 106 of FIG. 3 (e.g., application engine 320, rendering engine 322, pose tracker 326, mapping engine 328, and user interface engine 329).

One or more aspects of FIG. 4 may be described herein within the context of other Figures, including FIG. 1A, FIG. 1B, and FIG. 1C. In various examples, HMD 112 may generate map information, determine a pose, detect input, identify objects that are reflected in mirror 109, and present artificial reality content.

In accordance with one or more aspects of the present disclosure, HMD 112 of FIG. 1A and FIG. 4 may generate map information. For instance, with reference to FIG. 1A and FIG. 4, each of external sensors 190, cameras 192, sensor devices 208 collect information about physical environment 120A. External sensors 190 and cameras 192 communicates the information each collects to HMD 112, and such information may be communicated to HMD 112 over network 104 or through other means. HMD 112 receives information from external sensors 190 and/or cameras 192 and outputs to mapping engine 428 information about physical environment 120A. Sensor devices 208 of HMD 112 also collects information about physical environment 120A, and outputs to mapping engine 428 information about physical environment 120A. Mapping engine 428 determines, based on the information received from external sensors 190, cameras 192, and/or sensor devices 208, a map of physical environment 120A. Mapping engine 428 stores information about the map as map data 430.

HMD 112 may determine pose information. For instance, referring again to FIG. 1A and FIG. 4, motion sensor 206 and/or sensor devices 208 detect information about the position, orientation, and/or location of HMD 112. Pose tracker 426 receives from mapping engine 428 information about the position, orientation, and/or location of HMD 112. Pose tracker 426 determines, based on this information a current pose for a frame of reference of HMD 112.

HMD 112 may determine which objects are reflected in mirror 109. For instance, again with reference to FIG. 1A and FIG. 4, mapping engine 428 analyzes map data 430. Mapping engine 428 determines, based on the relative positions of the physical objects and mirror 109 within 120A, which physical objects within physical environment 120A are reflected in mirror 109. Mapping engine 428 may make such a determination from the perspective of one or more locations, but in the example of FIG. 1A, mapping engine 428 at least determines which physical objects within physical environment 120A are reflected within mirror 109 for the perspective of HMD 112.

HMD 112 may generate artificial reality content 122A. For instance, referring again to FIG. 1A and FIG. 4, mapping engine 428 outputs, to application engine 420, information about mapping information for physical environment 120A. Pose tracker 426 outputs, to application engine 420, information about the current pose determined for a frame of reference of HMD 112. Application engine 420 determines, based on the mapping and pose information, that from the perspective of user 101, HMD 112 is visible in mirror 109 (i.e., user 101 can see HMD 112 reflected by mirror 109). Application engine 420 determines, based on a configuration, type of application, execution context, user input, attributes of user 101, or other information, that it is appropriate to generate artificial reality content that includes a hat (i.e., virtual hat 123) located on the head of user 101. Application engine 420 determines an appropriate form for virtual hat 123, again based on a configuration, the type of application being executed, execution context, user input, attributes of user 101, or other information. Application engine 420 determines the orientation and/or position of virtual hat 123 within artificial reality content 122A based on the pose information associated with user 101. Application engine 420 generates, again based on the mapping and pose information, artificial reality content 122A. When generating artificial reality content 122A, application engine 420 overlays virtual hat 123 on the head of user 101.

HMD 112 may render artificial reality content 122A. For instance, referring to FIG. 1A and FIG. 4, application engine 420 outputs information about artificial reality content 122A to rendering engine 422, where such information includes information about the virtual hat 123 overlay. Rendering engine 422 causes artificial reality content 122A to presented at display 203 in the manner shown in FIG. 1A.

HMD 112 may cause a user interface to be presented. For instance, referring now to FIG. 1B and FIG. 4. Mapping engine 428 of HMD 112 receives information from external sensors 190 and/or cameras 192 about movements by user 101. Alternatively, or in addition, mapping engine 428 receives information from motion sensors 206 and/or sensor devices 208 about movements by user 101. Mapping engine 428 determines, based on the received information, that user 101 has touched mirror 109 at touch point 119. Mapping engine 428 outputs information about the movement to user interface engine 429. User interface engine 429 generates, based on the information received from mapping engine 428 and other information (e.g., application context or state), information sufficient to generate user interface menu 124. User interface engine 429 outputs information about user interface menu 124 to application engine 420. Application engine 420 updates artificial reality content 122A to include user interface menu 124, thereby generating artificial reality content 122B.

HMD 112 may render artificial reality content 122B. For instance, again referring to FIG. 1B and FIG. 4, application engine 420 outputs information about artificial reality content 122B to rendering engine 422, where such information includes information about user interface menu 124. Rendering engine 422 causes artificial reality content 122B to presented at display 203 in the manner shown in FIG. 1B.

HMD 112 may perform further operations in response to interactions with user interface menu 124. For instance, still referring to FIG. 1B and FIG. 4, HMD 112 may detect movements by user 101 that it determines corresponds to selection of one or more user interface elements 126 within user interface menu 124. Application engine 420 may, in response to such movements, perform one or more operations. In some examples, such operations may cause user interface engine 429 to generate further user interfaces. In such examples, application engine 420 updates artificial reality content 122B, and causes rendering engine 422 to present the updated content to the user at display 203.

Figure 5A:
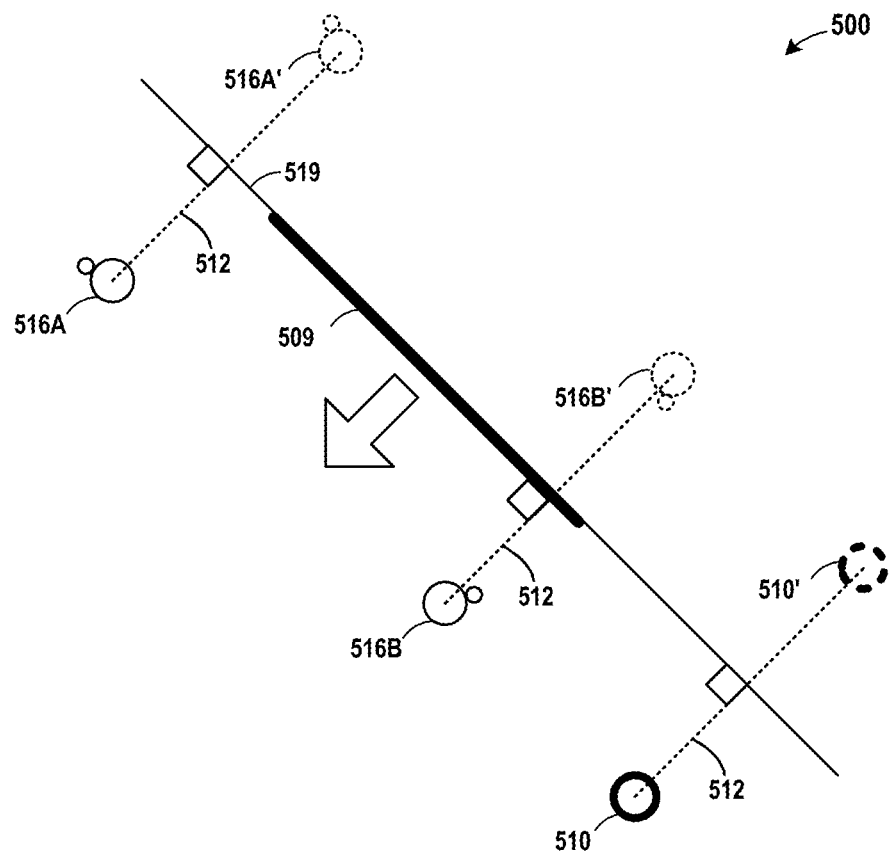
FIG. 5A and FIG. 5B are example diagrams illustrating one possible technique for identifying physical objects that are reflected in a mirror or other reflective surface, in accordance with one or more aspects of the present disclosure.
Figure 5B:
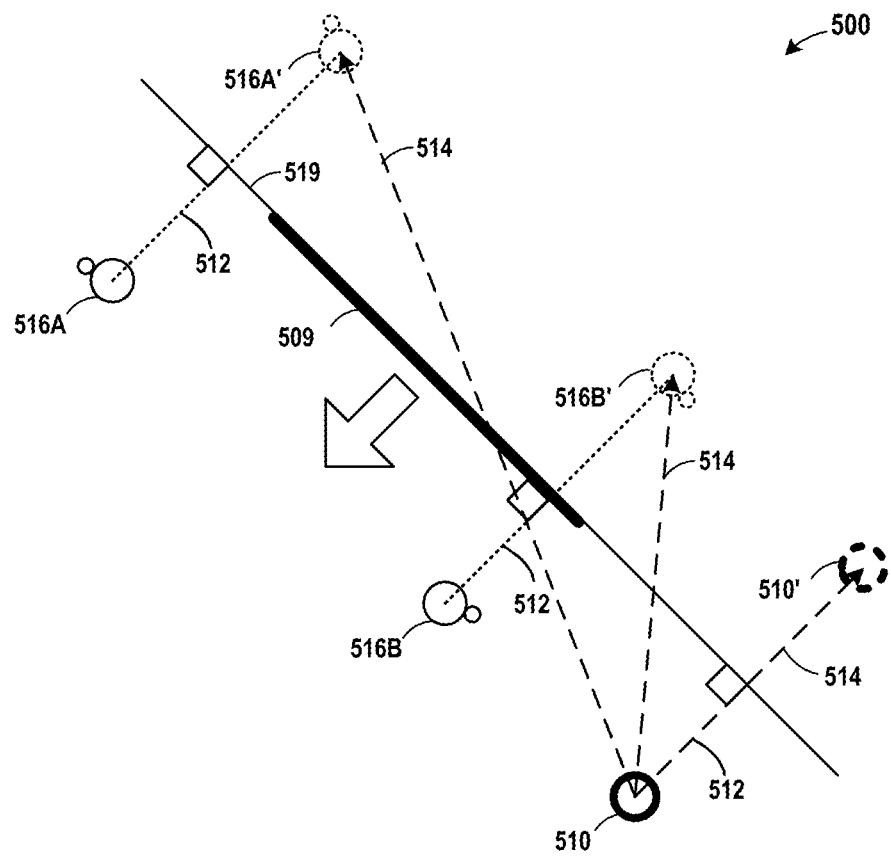

FIG. 5A and FIG. 5B are example diagrams illustrating one possible technique for identifying physical objects that are reflected in a mirror or other reflective surface, in accordance with one or more aspects of the present disclosure. FIG. 5A illustrates diagram 500 including mirror 509 mounted on a wall coincident with plane 519, with the reflective surface of mirror 509 facing in the direction indicated by the arrow. In FIG. 5A, the mirror and/or wall defines plane 519. Since the perspective of FIG. 5A and FIG. 5B are from above the wall, the mirror 509 and plane 519 are shown as a line. Observer 510 is shown in diagram 500, and the position of observer 510 may correspond to that of a camera, user, or other object. For instance, in FIG. 1A, observer 510 may be HMD 112 (or user 101).

Physical objects 516A and 516B (collectively "physical objects 516") are also shown in FIG. 5A, and for ease of illustration, each is illustrated as simply circle adjacent to a smaller circle, indicating a particular orientation relative to plane 519. For physical object 516A, a reflection of physical object 516A across plane 519 is illustrated as physical object 516A'. Similarly, for physical object 516B, a reflection of physical object 516B across plane 519 is illustrated as physical object 516B'. Each such reflection is indicated by one of trace lines 512, and each of trace lines 512 is perpendicular to plane 519.

FIG. 5B is similar to FIG. 5A, but also includes sight lines 514 extending from observer 510 to each of the reflections of physical objects 516 (physical objects 516'). Sight lines 514 are used in FIG. 5B to determine whether a reflection of any of physical objects 516 is visible to observer 510. Determining whether a reflection of each of physical objects 516 is visible to observer 510 involves evaluating whether each sight line 514 intersects plane 519 the two-dimensional region defined by mirror 509.

To determine which of physical objects 516 have reflections visible to observer 510, HMD 112 of FIG. 4 may generate a map of a physical area corresponding to diagram 500. For instance, in an example that can be described with reference to FIG. 5A and FIG. 4, mapping engine 428 generates map data 430 based on information received from sensor devices 208 or other sources. Application engine 420 identifies, based on map data 430, each of physical objects 516 and the positions of each of physical objects 516 within the physical environment associated with diagram 500. Application engine 420 reflects each of physical objects 516 across plane 519. To perform the reflection for each of physical objects 516, application engine 420 may cause mapping engine 428 to perform calculations and update map data 430 to reflect the positions of reflected physical objects 516' that are shown in FIG. 5A. Application engine 420 determines, based on such calculations, the position and scale of each of physical objects 516. Application engine 420 applies a negative scale to each of physical objects 516 along the normal to plane 519, thereby determining the orientation of each of physical objects 516. In some examples, scale changes can be simulated by moving virtual content as user moves, which then appears as a scale change within the 3D rendering environment. Negative scale can be used on the reflected virtual object though to change the orientation of the object. Another method for handling scale changes involves having two meshes, one is a reflected mesh, one is not.

HMD 112 may determine which of physical objects 516 are visible in mirror 509. For instance, referring now to FIG. 5B and FIG. 4, application engine 420 determines sight lines 514 from observer 510 to each of reflected physical objects 516'. Application engine 420 determines which of sight lines 514 intersect the region defined by the two-dimensional boundaries of mirror 509. For any reflections of physical objects (516') having a sight line 514 intersecting the region defined by the two-dimensional boundaries of mirror 509, application engine 420 identifies the corresponding physical objects 516 as having a reflection visible to observer 510. For any reflections of physical objects (516') having a sight line 514 not intersecting the region defined by the two-dimensional boundary of mirror 509, application engine 420 identifies the corresponding physical objects 516 as not having a reflection visible to observer 510. In the example of FIG. 5B, application engine 420 determines that from the perspective of observer 510, a reflection of physical object 516A is visible within mirror 509, since sight line 514 associated with physical object 516A (to 516A') intersects mirror 509. Application engine 420 determines that a reflection of physical object 516B, however, is not visible in mirror 509.

In some examples, application engine 420 may determine whether a reflection of each of physical objects 516 is visible in mirror 509 on a center-to-center basis (i.e., center of observer 510 to center of physical object 516), on a pixel-by-pixel basis, using a sphere or box trace, or using other methods. In some cases, application engine 420 may determine that some portion of a particular physical object 516 is visible in mirror 509, but not all of physical object 516 is visible. In such an example, and where artificial reality content is presented in connection with (e.g., at a locked position with) reflected images of objects, application engine 420 may generate only a portion of the artificial reality content for objects not fully reflected in mirror 509. Some physical objects 516 may have reflections that are "clipped" by the boundaries of mirror 509, and artificial reality content that is presented with reference to the position of such physical objects 516 might also be correspondingly "clipped" as appropriate.

Figure 6:
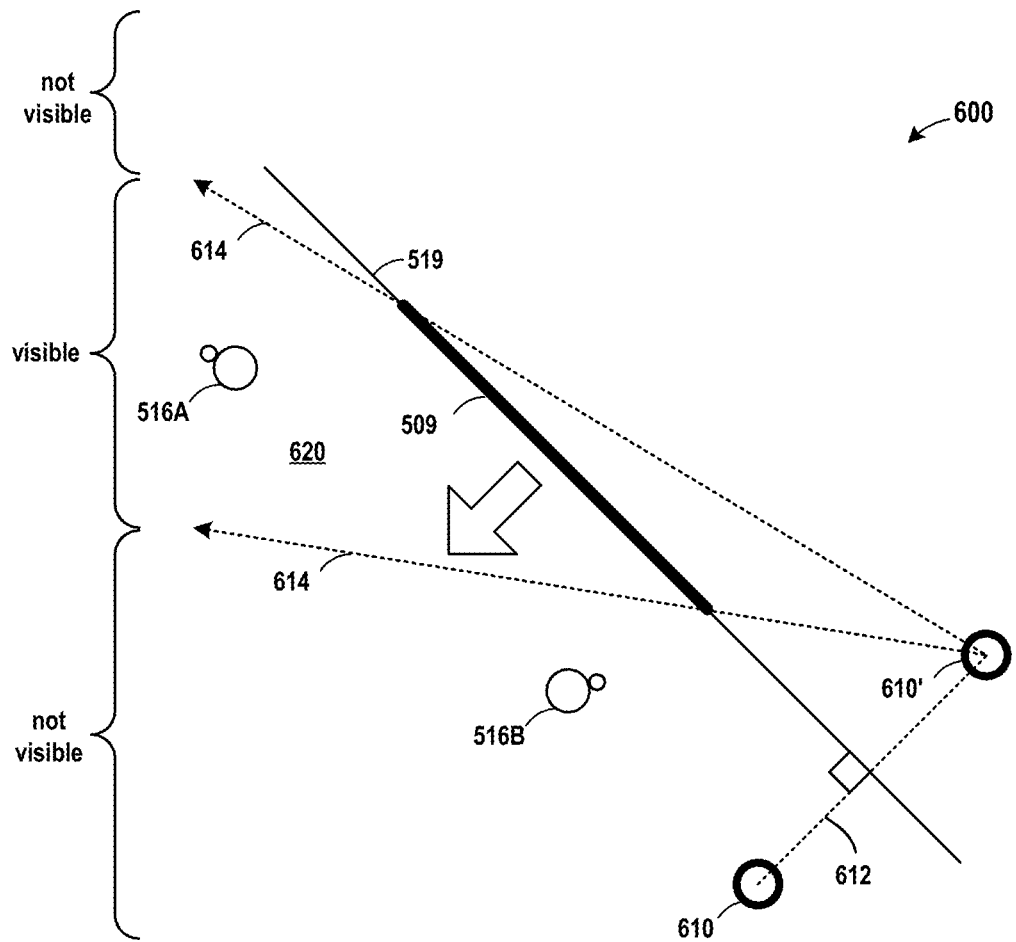
FIG. 6 is an example diagram illustrating another possible technique for identifying physical objects that are reflected in a mirror or other reflective surface, in accordance with one or more aspects of the present disclosure.

FIG. 6 is an example diagram illustrating another possible technique for identifying physical objects that are reflected in a mirror or other reflective surface, in accordance with one or more aspects of the present disclosure. FIG. 6 is similar to FIG. 5A and FIG. 5B in that it includes mirror 509 mounted on a wall coincident with plane 519, with the reflective surface of mirror 509 facing in the direction indicated by the arrow. The surface of mirror 509 and/or the wall that mirror 509 is mounted on defines plane 519. As in FIG. 5A and FIG. 5B, the perspective of FIG. 6 is from directly above the wall, so the mirror 509 and plane 519 are shown as a line. Observer 610 is also shown in diagram 600, and like observer 510 of FIG. 5A and FIG. 5B, may represent to the perspective of a camera, user, or other object.

In the example of FIG. 6, to determine which of physical objects 516 have reflections visible to observer 510, HMD 112 may generate a map of a physical area corresponding to diagram 600. For instance, with reference to FIG. 6 and FIG. 4, mapping engine 428 generates map data 430. Application engine 420 identifies, based on map data 430, physical objects 516A and 516B and the positions of each of physical objects 516 within the physical environment associated with diagram 600. Application engine 420 reflects observer 610 across plane 519 as observer 610', indicated by trace 612 in FIG. 6. To reflect observer 610 across plane 519, application engine 420 may cause mapping engine 428 to perform calculations and update map data 430 to reflect the position of observer 610' as illustrated in FIG. 6.

HMD 112 may determine which of physical objects 516 are visible in mirror 509. For instance, referring again to FIG. 6 and FIG. 4, application engine 420 determines sight lines 614 from reflected observer 610' to the outer boundaries of mirror 509. Application engine 420 constructs a three-dimensional frustrum 620 from the three-dimensional space defined by the point at which observer 610' is positioned and the two-dimensional region defined by the boundaries of mirror 509. Where mirror 509 is a square, for example, frustrum 620 has a form similar to a clipped pyramid (often an oblique pyramid) that begins at mirror 509 and extends into the room in which mirror 509 is located, with one base of the frustrum being coincident with the surface of mirror 509. Where mirror 509 is circular, on the other hand, frustrum 620 is conical (often an oblique conical frustrum) with one base of frustrum 620 again being coincident with the surface of mirror 509.

Application engine 420 determines whether a given physical object 516 has a reflection visible to observer 610 by determining whether that physical object 516 is within frustrum 620. In the example of FIG. 6, application engine 420 determines that since physical object 516A is within frustrum 620, so engine 420 determines that a reflection of physical object 516A is visible within mirror 509 from the perspective of observer 610. Application engine 420 further determines that since physical object 516B is not within frustrum 620, no visible reflection of physical object 516B is shown within mirror 509 from the perspective of observer 610.

Although FIG. 5A, 5B and FIG. 6 are described in terms of determining whether a given object is reflected in a mirror based on calculating positions of objects in a map, it may be possible to make such determinations in another way. For instance, application engine 420 may, alternatively or in addition, analyze an image of a mirror and based on the appearance of any reflected objects in the mirror, determine what physical objects correspond to those reflections.

Figure 7A:
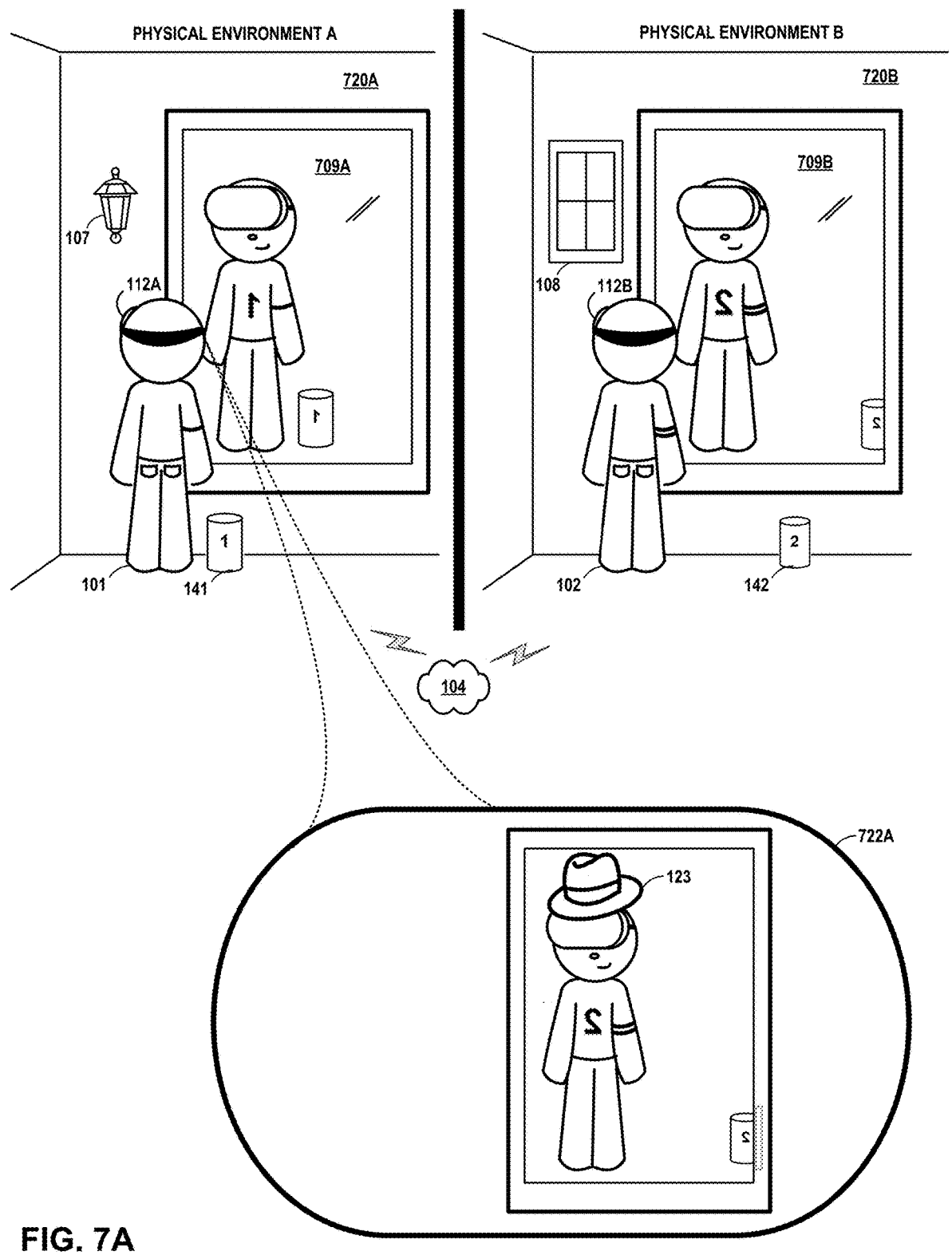
FIG. 7A, FIG. 7B, and FIG. 7C are conceptual diagrams illustrating example techniques for enabling multiple users to communicate and/or perform other operations using a mirror, in accordance with one or more aspects of the present disclosure.
Figure 7B:
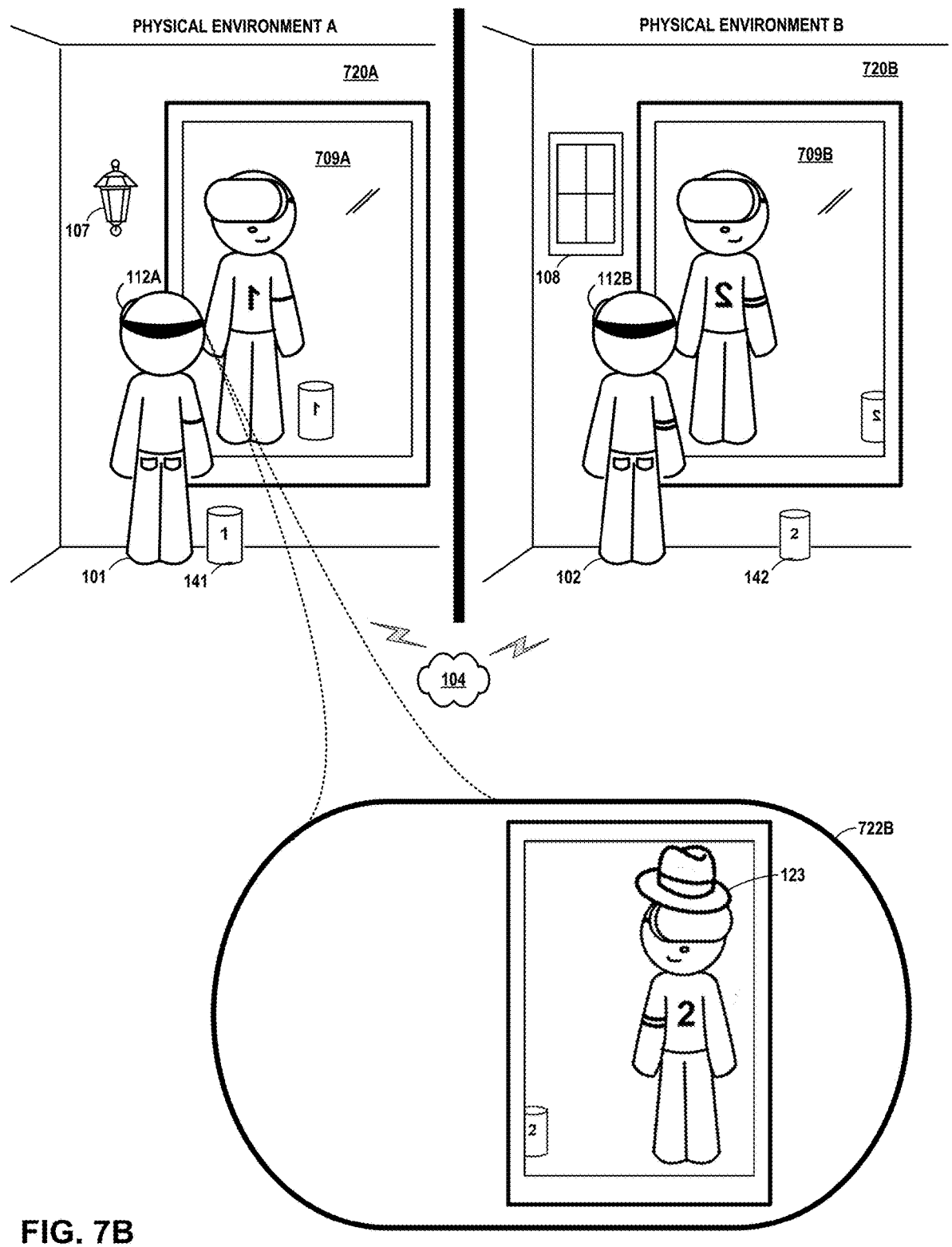
Figure 7C:
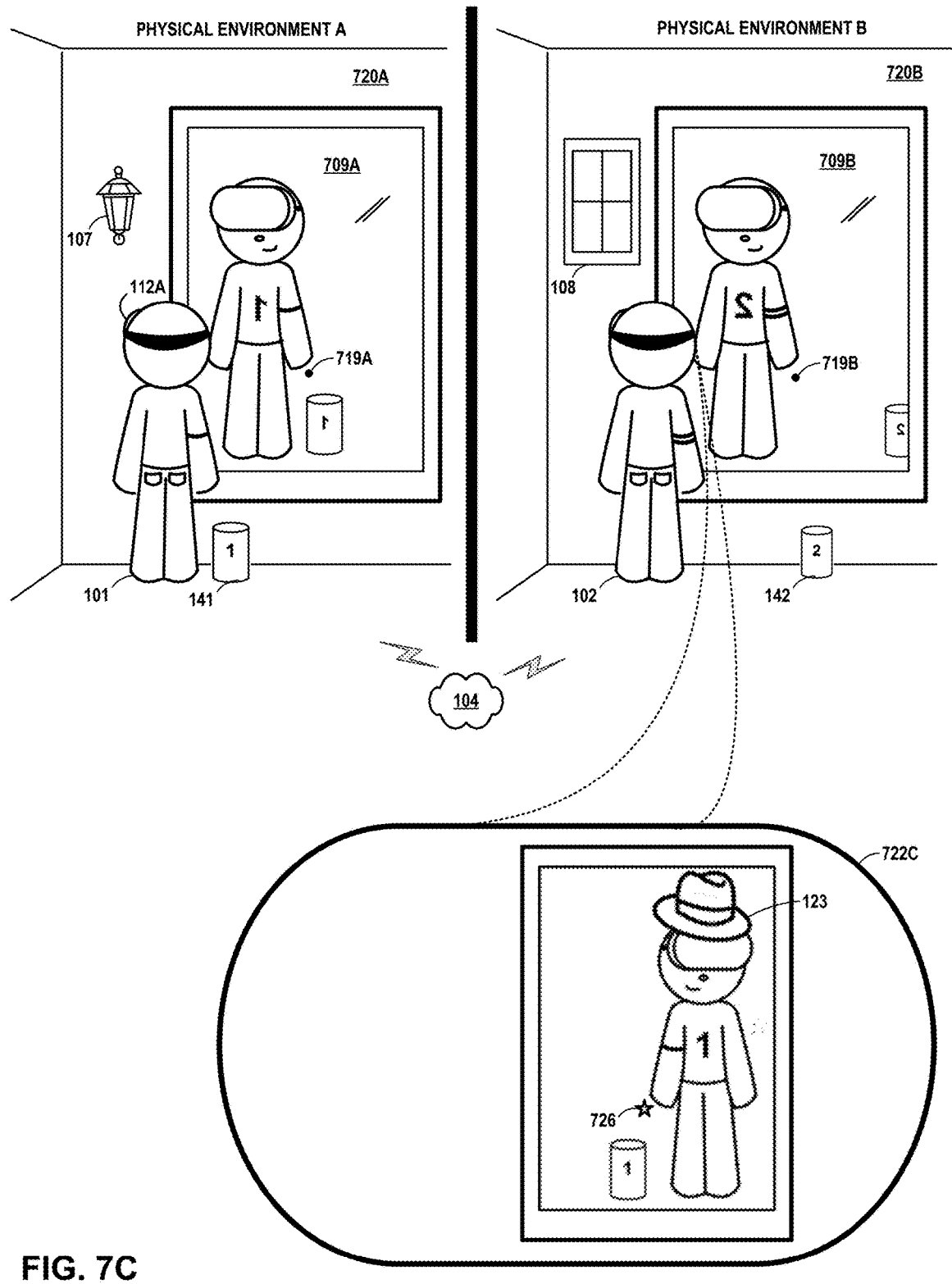

FIG. 7A, FIG. 7B, and FIG. 7C are conceptual diagrams illustrating example techniques for enabling multiple users to communicate and/or perform other operations using a mirror, in accordance with one or more aspects of the present disclosure. Each of FIG. 7A, FIG. 7B, and FIG. 7C illustrates physical environment 720A and physical environment 720B. Physical environment 720A is occupied by user 101 and physical environment 720B is occupied by user 102. Physical environment 720A includes mirror 109A and physical environment 720 includes mirror 109B. Other physical objects are present in each of physical environments 720A and 720B, including lamp 107, window 108, object 141, and object 142.

In physical environment 720A, user 101 can see his reflection in mirror 109A, and user 101 wears HMD 112A. HMD 112A is configured in a manner similar to that described in connection with FIG. 4. In physical environment 720B, user 102 can see his reflection in mirror 109B, and user 102 wears 112B. Like HMD 112A, HMD 112B is configured in a manner similar to that described in connection with FIG. 4.

In each of FIG. 7A, FIG. 7B, and FIG. 7C, user 101 wears a shirt bearing the "1" numeral and having one stripe on the right sleeve. In each of FIG. 7A, FIG. 7B, and FIG. 7C, user 102 wears a shirt bearing the "2" numeral and having two stripes on the right sleeve.

In the example of FIG. 7A, and in accordance with one or more aspects of the present disclosure, HMD 112A may determine that user 101 seeks to communicate with user 102. For instance, in an example that can be described with reference to FIG. 7A and FIG. 4, motion sensors 206 of HMD 112A detect motion and sensor devices 208 capture images. Motion sensors 206 and sensor devices 208 output information about the detected motion and captured images to pose tracker 426. Pose tracker 426 determines, based on the information, that user 101 has performed a gesture touching mirror 109A. Pose tracker 426 outputs information about the gesture to application engine 420. Application engine 420 determines that the gesture corresponds to a request to initiate communication with user 102. In some examples, the gesture may involve interactions with a user interface, such as that illustrated in FIG. 1B.

HMD 112A may establish communication with HMD 112B. For instance, with reference to FIG. 7A and FIG. 4, application engine 420 determines that user 102 is wearing HMD 112B. Application engine 420 causes HMD 112A to communicate, over network 104, with HMD 112B. Application engine 420 causes HMD 112A to exchange information with HMD 112B over network 104, and thereby establishes communication between HMD 112A and HMD 112B.

HMD 112A may present artificial reality content 722A to user 101. For instance, still referring to FIG. 7A and FIG. 4, HMD 112B captures images of user 102 that are reflected by mirror 709B. HMD 112B communicates the images over network 104 to HMD 112A. Application engine 420 of HMD 112A uses the images to construct artificial reality content 722A, showing an image of user 102 overlaid on the reflected image that user 101 would otherwise see in mirror 709A. Application engine 420 outputs information about artificial reality content 722A to rendering engine 422. Rendering engine 422 causes artificial reality content 722A to be presented at display 203 (within HMD 112A) in the manner shown in FIG. 7A.

HMD 112A may enable user 101 and user 102 to engage in an audio and/or video conference. For instance, still referring to FIG. 7A, sensor devices 208 capture audio information and output the audio information to application engine 420. Sensor devices 208 also capture images of user 101 reflected in mirror 709A, and output image data to application engine 420. Application engine 420 receives the audio and image data and causes HMD 112A to communicate the information over network 104 to HMD 112B. HMD 112B performs a similar task, capturing audio and video information of user 102 within physical environment 720B. HMD 112A receives, over network 104, the audio and video information from HMD 112B. Application engine 420 uses the information to update artificial reality content 722A. Application engine 420 outputs information to rendering engine 422. Rendering engine 422 causes artificial reality content 722A to be presented at display 203 (within HMD 112A), providing user 101 with a substantially continuous view of user 102, as reflected by mirror 709B at physical environment 720B. If both HMD 112A and HMD 112B similarly present artificial reality content in the manner described, HMD 112A and HMD 112B thereby enable user 101 and user 102 to engage in an audio and/or video conference where users 101 and 102 can see and hear each other in mirrors 709A and 709B.

In some examples, HMD 112A and HMD 112B may exchange images that include user 101 and user 102 only when each of user 101 and user 102 are present in front of their respective mirrors 709. In other words, even though HMD 112A and HMD 112B may have access to images within physical environments 720A and 720B of user 101 and user 102, respectively, even when user 101 and user 102 are not in front of a mirror, each of HMD 112A and HMD 112B might, at times, not display such images during a video conference.

Further, although described in terms of two users engaging in a video conference, techniques described herein may apply to multiple users engaged in a video conference. For instance, a group of users may be present in front of the same mirror or multiple users may be present at separate mirrors in different physical environments.

FIG. 7B is a conceptual diagram illustrating artificial reality content 722B, which is an alternative version of artificial reality content 722A as presented by HMD 112A in FIG. 7A. In the example described above in connection with FIG. 7A, HMD 112B captures reflected images of user 102 as seen by HMD 112B in mirror 709B. HMD 112B communicates those images over network 104 to HMD 112A, and HMD 112A uses the images to present artificial reality content 722A, as shown in FIG. 7A. In the example of FIG. 7B, HMD 112A adjusts the images received from HMD 112B so that they are not presented as reflected or mirror-image versions of user 102. Instead, in the example of FIG. 7B, HMD 112A reverses the images received from HMD 112B so that they are presented as artificial reality content 722B without a mirror-image effect. Note, for example, that the numeral "2" on the shirt worn by user 102 is presented in a non-reversed way, as is the numeral "2" printed on object 142 present within physical environment 720B. And although HMD 112A is described as performing processing to adjust the images captured in physical environment 720B to reverse the "mirror-image" effect, such processing may be done by a different device or system, including by HMD 112B.

Further, HMD 112A may further process images captured in physical environment 720B to generate artificial reality content 722B that has a different version of user 102 overlaid on the images of user 102. For instance, while in some examples, HMD 112A may generate photorealistic version of user 102, in other examples, HMD 112A may generate an avatar, skeleton, just the virtual hat user 102 is wearing, or any other appropriate representation of user 102. HMD 112A may cause rendering engine 422 to present such content at display 203 within 112A.

FIG. 7C is a conceptual diagram illustrating artificial reality content 722C presented by HMD 112B, which shows images of user 101 captured by HMD 112A at physical environment 720A. In FIG. 7C, HMD 112B receives, over network 104, images of user 101 captured by HMD 112A at physical environment 720A. HMD 112B uses the images to generate artificial reality content 722B that includes images of user 101 captured at physical environment 720A. HMD 112B may adjust the images to reverse any "mirror-image" effect that may be present in the images received from HMD 112A. HMD 112B may cause artificial reality content 722B to be presented to user 102 in HMD 112B. HMD 112B may generate substantially continuous updates to artificial reality content 722B, and present such artificial reality content 722B to user 102, as illustrated in FIG. 7C.

In some examples, HMD 112A may determine that user 101 seeks to transfer data from 112A to user 102 (wearing HMD 112B). For instance, with reference to FIG. 7C and FIG. 4, motion sensors 206 of HMD 112A detect motion and sensor devices 208 capture images. Motion sensor 206 and sensor devices 208 output information about the detected motion and captured images to pose tracker 426. Pose tracker 426 determines, based on the information, that user 101 has performed a gesture (or a series of gestures) that involves touching mirror 109A at touch point 719A. Pose tracker 426 outputs information about the gesture to application engine 420. Application engine 420 determines that the gesture corresponds to a request to transfer data (e.g., a file or other media) from HMD 112A to HMD 112B.

HMD 112A may, responsive to the gesture, perform the transfer from HMD 112A to HMD 112B without requiring input from user 102. For instance, with reference to FIG. 7C and FIG. 4, and in such an example, 112A transfers the data identified by the gesture to HMD 112B over network 104. HMD 112B receives the data and stores the data. HMD 112B may update artificial reality content 722C to include content or a notification indicating that data was received. HMD 112B presents the updated artificial reality content 722C to the user 102 within HMD 112B.

In a different example, HMD 112A may require confirmation input from user 102 before performing the transfer to HMD 112B. For instance, again with reference to FIG. 7C and FIG. 4, and in response to the gesture requesting the data transfer, application engine 420 causes HMD 112A to output a signal over network 104. HMD 112B detects the signal and determines that the signal corresponds to a request to receive data from HMD 112A. HMD 112B presents a user interface, within artificial reality content 722C, prompting user 102 to accept the request. HMD 112B further prompts user 102 to accept the request by touching touch point 719B on mirror 709B, which may, in some examples, be a point on mirror 709B that positionally corresponds to touch point 719A on mirror 709A previously touched by user 101. Specifically, in the example of FIG. 7C, HMD 112B prompts user 102 to touch the appropriate location on mirror 709B by including user interface element 726 within artificial reality content 722C, where user interface element 726 is presented within artificial reality content 722C at the appropriate place at which user 102 should touch mirror 709B to indicate acceptance. HMD 112B subsequently detects input from user 102. In some examples, HMD 112B determines that the input includes user 102 touching touch point 719B to thereby indicate acceptance of the file transfer. In response to such input, HMD 112B communicates with HMD 112A to signal acceptance of the file transfer, thereby causing HMD 112A to transfer the file to HMD 112B. In other examples, HMD 112B might determine that user 102 has not indicated acceptance of the file transfer, and in such an example, HMD 112A might not transfer the data.

In the described example, user 101 transfers data from HMD 112A to HMD 112B through a touch interface involving mirror 709A and mirror 709B. In some implementations, such a process may be perceived to be a useful and intuitive way for user 101 and user 102 to transfer data. User interface element 726 may be illustrated within HMD 112A and HMD 112B as a cube or other three-dimensional object that is handed between users 101 and 102, providing further parallels to real-world interactions. Accordingly, users 101 and 102 may perceive such interactions with mirror 709A and mirror 709B to be a natural extension of real-world actions (e.g., handing an physical object to another person), particularly where touch point 719A and touch point 719B correspond to similar points on mirror 709A and mirror 709B, respectively.

Figure 8:
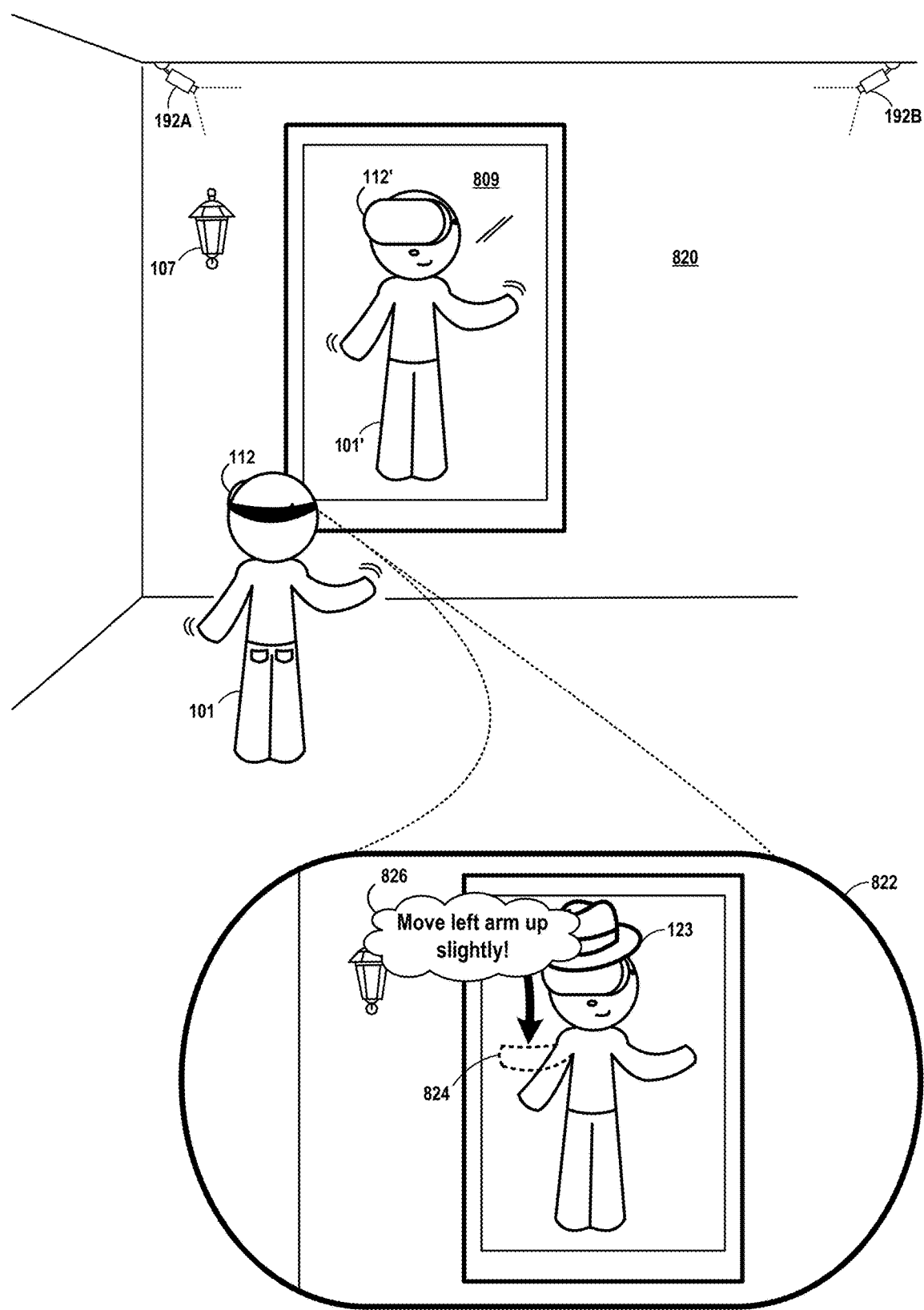
FIG. 8 is a conceptual diagram illustrating an example technique for providing movement instruction using a mirror, in accordance with one or more aspects of the present disclosure.

FIG. 8 is a conceptual diagram illustrating an example technique for providing movement instruction using a mirror, in accordance with one or more aspects of the present disclosure. FIG. 8 illustrates physical environment 820 including mirror 809. Physical environment 820 is illustrated as a room, occupied by user 101 wearing HMD 112, that is similar to other physical environments illustrated herein, and may include physical objects similar to others described herein. In the example illustrated in FIG. 8, HMD 112 may present artificial reality content 822 that provides movement instruction based on movements performed by user 101 as reflected in mirror 809. Some exercise, dance, and other movements are often performed in front of a mirror, and presenting artificial reality content that provides useful information to user 101 while such movements are being performed may be perceived by a user as a natural or intuitive extension of such practices. Other movements not typically performed in front of a mirror may nevertheless be presented in a similar manner, such as providing out-of-box product instructions, quick start instructions, or how-to instructions.

In the example of FIG. 8, and in accordance with one or more aspects of the present disclosure, HMD 112 may monitor movements performed by user 101. For instance, with reference to FIG. 8 and FIG. 4, motion sensors 206 of HMD 112A detect motion and sensor devices 208 capture images. Motion sensors 206 and sensor devices 208 output information about the detected motion and captured images to pose tracker 426. Pose tracker 426 determines, based on the information, that user 101 is performing a series of movements. Pose tracker 426 outputs information about the series of movements to application engine 420.

HMD 112 may compare detected movements to a model set of movements. For instance, still referring to FIG. 8 and FIG. 4, application engine 420 analyzes the movements and determines a model set of movements. In some examples, application engine 420 may determine the model set of movements based on an analysis of the detected series of movements. In other examples, application engine 420 may determine the model set of movements based on input (e.g., previously detected input where user 101 indicates a particular dance routine that he is performing). Application engine 420 compares the detected series of movements to the model set of movements.

HMD 112 may generate content that assists user 101 in performing movements. For instance, again referring to FIG. 8 and FIG. 4, application engine 420 identifies differences between the detected series of movements and the model set of movements. Application engine 420 generates artificial reality content 822 providing feedback about whether the detected movements match or sufficiently match the model set of movements. In some examples, the detected movements might not sufficiently match the model set of movements. In such an example, application engine 420 may generate artificial reality content 822 indicating one or more differences between the compared movements. As illustrated in FIG. 8, artificial reality content 822 may include movement instruction 826 as to how user 101 might modify his movements to be closer to the model set of movements. Alternatively, or in addition, artificial reality content 822 may include content (e.g., adjusted arm position 824) indicating a particular motion or movement that may improve the degree to which movements performed by user 101 match those of the model set of movements.

In some examples, artificial reality content 822 may present artificial reality content overlaid on images of user 101 that may include a dance costume, or workout clothes. In other examples, such content may include or be modeled after user 101 as an avatar, a skeleton, or other digital representation of user 101; in still other examples, such content might be modeled after a celebrity athlete or other known person.

Figure 9:
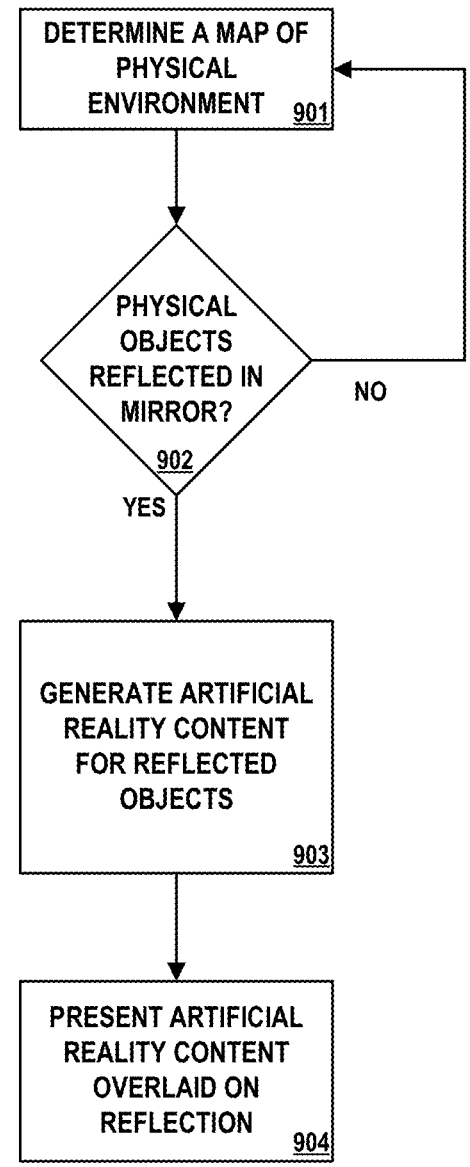
FIG. 9 is a flow diagram illustrating operations performed by an example artificial reality console in accordance with one or more aspects of the present disclosure.

FIG. 9 is a flow diagram illustrating operations performed by an example console 106 in accordance with one or more aspects of the present disclosure. FIG. 9 is described below within the context of artificial reality system 100A of FIG. 1. In other examples, operations described in FIG. 9 may be performed by one or more other components, modules, systems, or devices. Further, in other examples, operations described in connection with FIG. 9 may be merged, performed in a difference sequence, omitted, or may encompass additional operations not specifically illustrated or described.

In the process illustrated in FIG. 9, and in accordance with one or more aspects of the present disclosure, console 106 may determine a map of a physical environment (901). For example, with reference to FIG. 1A, each of HMD 112, external sensors 190, and/or cameras 192 capture images within physical environment 120A. Console 106 receives such images and determines the position of physical objects within physical environment 120A, including user 101, HMD 112, and mirror 109. Console 106 generates map data (e.g., map data 330 in FIG. 3) describing the physical environment.

Console 106 may identify any physical objects reflected in the mirror (902). For example, in FIG. 1A, console 106 determines which physical objects are, from the perspective of HMD 112, visible in mirror 109. In some examples, determining which physical objects are visible in mirror 109 may involve one or more of the techniques described in connection with FIG. 5A, FIG. 5B, and/or FIG. 6. In the example of FIG. 1A, console 106 determines that images of user 101 and object 141 are visible in mirror 109.

Console 106 may generate artificial reality content for the reflected objects (903). For example, in FIG. 1A, console 106 generates artificial reality content 122A by overlaying virtual content on images reflected in mirror 109. In the example of FIG. 1A, console 106 overlays virtual hat 123 on the image of the user's head. In some examples, virtual hat 123 is locked to that user's head (or to HMD 112) so that when user 101 (or HMD 112 moves), console 106 updates artificial reality content 122A to keep virtual hat 123 positioned relative to the user's head, in a manner consistent with how a physical hat would move in such a situation.

Console 106 may present artificial reality content overlaid on the reflections in the mirror (904). For example, in FIG. 1A, console 106 causes HMD 112 to present artificial reality content 122A to user 101 within HMD 112 in the manner shown in FIG. 1A.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some examples, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
    an image capture system including a head-mounted display (HMD) worn by a user, wherein the image capture system is configured to capture image data representative of a physical environment, and wherein the physical environment includes a reflective surface and the HMD;
    a mapping engine configured to determine, based on the image data, a map of the physical environment, wherein the map includes position information about the reflective surface and the HMD; and
    an application engine configured to:
    determine, based on the position information about the reflective surface and the HMD, that the user is visible as a reflected image in the reflective surface,
    identify, from the image data, a series of movements performed by the user, and
    generate artificial reality content to be overlaid on an image of the reflected image of the user, wherein the artificial reality content illustrates a model set of movements for the user that differ from the series of movements performed by the user, and wherein the artificial reality content illustrates how to correct differences between the series of movements performed by the user and the model set of movements.

2. The artificial reality system of claim 1, further comprising:
    a rendering engine configured to render, for display at the HMD and overlaid on the image of the reflected image of the user, the artificial reality content that illustrates the model set of movements.

3. The artificial reality system of claim 1, wherein to generate the artificial reality content, the application engine is further configured to:
    generate at least one of a series of images of the user performing the model set of movements, a digital representation of the user performing the model set of movements, a skeleton performing the model set of movements, or an avatar performing the model set of movements.

4. The artificial reality system of claim 3, wherein to generate the artificial reality content, the application engine is further configured to:
    generate the artificial reality content as mirrored artificial reality content so that it corresponds to the user's view of the reflected image in the reflective surface.

5. The artificial reality system of claim 1, wherein to generate the artificial reality content, the application engine is further configured to:
    generate the artificial reality content at a position defined by the position of the user, so that when the user moves, the artificial reality content is moved so that it remains at a substantially fixed position relative to the reflected image of the user.

6. The artificial reality system of claim 1, wherein the artificial reality content that illustrates differences between the series of movements performed by the user and the model set of movements corresponds to at least one of:
dance instruction, exercise instruction, or product use instruction.

7. A method comprising:
capturing, by an image capture system including a head-mounted display (HMD) worn by a user, image data representative of a physical environment, wherein the physical environment includes a reflective surface and the HMD;
determining, based on the image data, a map of the physical environment, wherein the map includes position information about the reflective surface and the HMD;
determining, based on the position information about the reflective surface and the HMD, that the user is visible as a reflected image in the reflective surface;
identifying, from the image data, a series of movements performed by the user; and
generating artificial reality content to be overlaid on an image of the reflected image of the user, wherein the artificial reality content illustrates a model set of movements for the user that differ from the series of movements performed by the user, and wherein the artificial reality content illustrates how to correct differences between the series of movements performed by the user and the model set of movements.

8. The method of claim 7, further comprising:
rendering, for display at the HMD and overlaid on the image of the reflected image of the user, the artificial reality content that illustrates the model set of movements.

9. The method of claim 7, wherein generating the artificial reality content includes:
generating at least one of a series of images of the user performing the model set of movements, a digital representation of the user performing the model set of movements, a skeleton performing the model set of movements, or an avatar performing the model set of movements.

10. The method of claim 7, wherein generating the artificial reality content includes:
generating the artificial reality content as mirrored artificial reality content so that it corresponds to the user's view of the reflected image in the reflective surface.

11. The method of claim 7, wherein the reflective surface is a mirror, and generating the artificial reality content includes:
generating the artificial reality content at a position defined by the position of the user, so that when the user moves, the artificial reality content is moved so that it remains at a substantially fixed position relative to the reflected image of the user.

12. The method of claim 7, wherein the artificial reality content that illustrates differences between the series of movements performed by the user and the model set of movements corresponds to at least one of:
dance instruction, exercise instruction, or product use instruction.

13. A non-transitory computer-readable medium comprising instructions for causing processing circuitry of an artificial reality system to perform operations comprising:
capturing, by an image capture system including a head-mounted display (HMD) worn by a user, image data representative of a physical environment, wherein the physical environment includes a reflective surface and the HMD;
determining, based on the image data, a map of the physical environment, wherein the map includes position information about the reflective surface and the HMD;
determining, based on the position information about the reflective surface and the HMD, that the user is visible as a reflected image in the reflective surface;
identifying, from the image data, a series of movements performed by the user; and
generating artificial reality content to be overlaid on an image of the reflected image of the user, wherein the artificial reality content illustrates a model set of movements for the user that differ from the series of movements performed by the user, and wherein the artificial reality content illustrates how to correct differences between the series of movements performed by the user and the model set of movements.

14. The non-transitory computer-readable medium of claim 13, further comprising instructions for causing the processing circuitry to perform operations comprising:
rendering, for display at the HMD and overlaid on the image of the reflected image of the user, the artificial reality content that illustrates the model set of movements.

15. The non-transitory computer-readable medium of claim 13, wherein generating the artificial reality content includes:
generating at least one of a series of images of the user performing the model set of movements, a digital representation of the user performing the model set of movements, a skeleton performing the model set of movements, or an avatar performing the model set of movements.

16. The non-transitory computer-readable medium of claim 13, wherein generating the artificial reality content includes:
generating the artificial reality content as mirrored artificial reality content so that it corresponds to the user's view of the reflected image in the reflective surface.

17. The non-transitory computer-readable medium of claim 13, wherein the reflective surface is a mirror, and generating the artificial reality content includes:
generating the artificial reality content at a position defined by the position of the user, so that when the user moves, the artificial reality content is moved so that it remains at a substantially fixed position relative to the reflected image of the user.

* * * * *